US011870881B2

(12) United States Patent
Khedr et al.

(10) Patent No.: US 11,870,881 B2
(45) Date of Patent: *Jan. 9, 2024

(54) METHOD OF OPERATION FOR A CONFIGURABLE NUMBER THEORETIC TRANSFORM (NTT) BUTTERFLY CIRCUIT FOR HOMOMORPHIC ENCRYPTION

(71) Applicant: THE GOVERNING COUNCIL OF THE UNIVERSITY OF TORONTO, Toronto (CA)

(72) Inventors: Alhassan Khedr, Toronto (CA); Glenn Gulak, Toronto (CA)

(73) Assignee: THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/953,224

(22) Filed: Sep. 26, 2022

(65) Prior Publication Data
US 2023/0086526 A1 Mar. 23, 2023

Related U.S. Application Data

(63) Continuation of application No. 16/921,028, filed on Jul. 6, 2020, now Pat. No. 11,456,856, which is a
(Continued)

(51) Int. Cl.
*H04L 9/06* (2006.01)
*H04L 9/00* (2022.01)
(Continued)

(52) U.S. Cl.
CPC .............. *H04L 9/008* (2013.01); *G09C 1/00* (2013.01); *H04L 9/0618* (2013.01); *G06F 7/50* (2013.01);
(Continued)

(58) Field of Classification Search
CPC ... H04L 9/008; H04L 9/0618; H04L 2209/12; G09C 1/00; G06F 7/50; G06F 9/3001;
(Continued)

(56) References Cited

U.S. PATENT DOCUMENTS 10,298,385 B2 * 5/2019 Khedr .................. G09C 1/00
10,644,877 B2 * 5/2020 Khedr .................. H04L 9/008
(Continued)

*Primary Examiner* — Baotran N To
(74) *Attorney, Agent, or Firm* — Lance Kreisman; Peninsula Patent Group

(57) ABSTRACT

Fully homomorphic encryption integrated circuit (IC) chips, systems and associated methods are disclosed. In one embodiment, a method of operation for a number theoretic transform (NTT) butterfly circuit is disclosed. The (NTT) butterfly circuit includes a high input word path cross-coupled with a low word path. The high input word path includes a first adder/subtractor, and a first multiplier. The low input word path includes a second adder/subtractor, and a second multiplier. The method includes selectively bypassing the second adder/subtractor and the second multiplier, and reconfiguring the low and high input word paths into different logic processing units in response to different mode control signals.

19 Claims, 15 Drawing Sheets

Related U.S. Application Data continuation of application No. 16/365,463, filed on Mar. 26, 2019, now Pat. No. 10,715,309, which is a continuation of application No. 15/674,864, filed on Aug. 11, 2017, now Pat. No. 10,298,385.

(60) Provisional application No. 62/484,304, filed on Apr. 11, 2017.

(51) Int. Cl.
*G09C 1/00* (2006.01)
*G06F 9/30* (2018.01)
*G06F 7/50* (2006.01)

(52) U.S. Cl.
CPC ........ *G06F 9/3001* (2013.01); *G06F 9/30029* (2013.01); *G06F 2207/4802* (2013.01); *H04L 2209/12* (2013.01)

(58) Field of Classification Search
CPC ......... G06F 9/30029; G06F 2207/4802; G06F 15/78
See application file for complete search history.

(56) References Cited

U.S. PATENT DOCUMENTS

| | | |
|---|---|---|
| 10,715,309 B2 * | 7/2020 | Khedr .................... H04L 9/0618 |
| 11,456,856 B2 * | 9/2022 | Khedr ...................... H04L 9/008 |
| 2017/0155628 A1 * | 6/2017 | Rohloff ................... H04L 63/02 |
| 2017/0180115 A1 * | 6/2017 | Laine ...................... H04L 9/0618 |
| 2017/0293913 A1 * | 10/2017 | Gulak ................ G06Q 20/3829 |

* cited by examiner

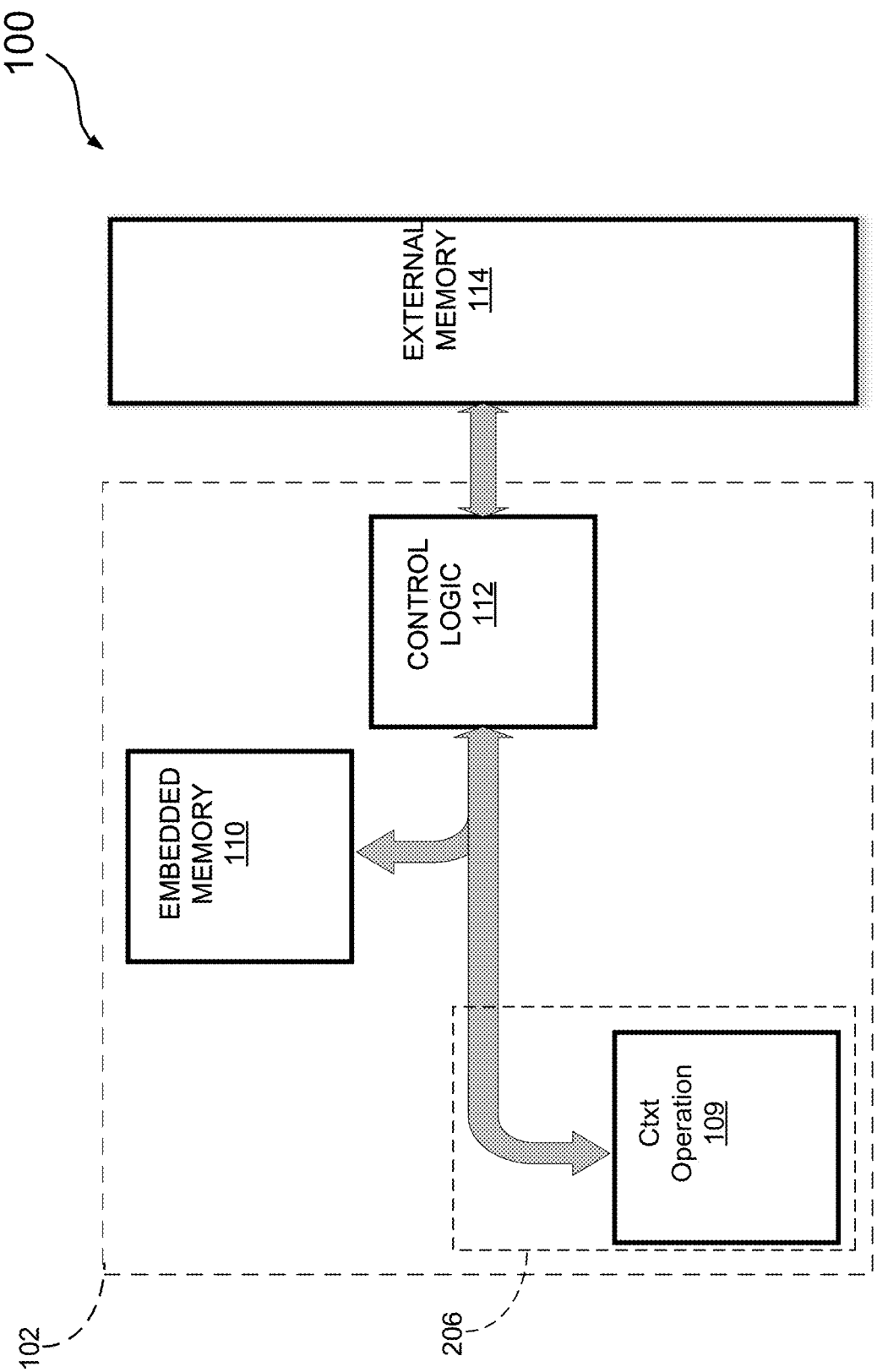

METHOD OF OPERATION FOR A CONFIGURABLE NUMBER THEORETIC TRANSFORM (NTT) BUTTERFLY CIRCUIT FOR HOMOMORPHIC ENCRYPTION

CROSS-REFERENCE TO RELATED APPLICATIONS

This application is a Continuation that claims priority to U.S. patent application Ser. No. 16/921,028, entitled A CONFIGURABLE NUMBER THEORETIC TRANSFORM (NTT) BUTTERFLY CIRCUIT FOR HOMOMORPHIC ENCRYPTION, filed Jul. 6, 2020, which is a Continuation that claims priority to U.S. patent application Ser. No. 16/654,463, entitled A METHOD OF OPERATION FOR A CONFIGURABLE NUMBER THEORETIC TRANSFORM (NTT) BUTTERFLY CIRCUIT FOR HOMOMORPHIC ENCRYPTION, filed Mar. 26, 2019, now U.S. Pat. No. 10,715,309, which is a Continuation that claims priority to U.S. patent application Ser. No. 15/674,864, entitled HOMOMORPHIC PROCESSING UNIT (HPU) FOR ACCELERATING SECURE COMPUTATIONS UNDER HOMOMORPHIC ENCRYPTION, filed Aug. 11, 2017, now U.S. Pat. No. 10,298,385, which is a Non-Provisional that claims priority to U.S. Provisional Application No. 62/484,304, filed Apr. 11, 2017, entitled A HOMOMORPHIC PROCESSING UNIT (HPU) FOR ACCELERATING SECURE COMPUTATIONS UNDER FULLY HOMOMORPHIC ENCRYPTION, all of which are incorporated herein by reference in their entirety.

TECHNICAL FIELD

The disclosure herein relates to hardware accelerators, and more particularly homomorphic hardware accelerators and associated methods.

BACKGROUND

Fully homomorphic encryption provides the ability for a third party to carry out computations on encrypted data without having to first decrypt the data. This form of encryption allows users to store their private encrypted data on, for example, a remote server, while enabling the data storage facility to process the encrypted data. Fully homomorphic encryption lends itself well to a cloud-based computing environment.

While offering great promise by preserving privacy for data owners, operations involving encrypted data are nevertheless computation-intensive.

SUMMARY

Homomorphic processor chips, systems and associated methods are disclosed. In one embodiment, an integrated circuit (IC) homomorphic processor chip is disclosed. The IC homomorphic processor chip includes at least one processor slice. Each processor slice includes local control circuitry, a number theoretic transform (NTT) butterfly unit, and on-chip memory. The NTT butterfly unit is responsive to the local control circuitry to operate in multiple modes for performing operations on encrypted data using homomorphic encryption. Each mode is associated with a different configuration of the NTT butterfly unit.

In another embodiment, the NTT butterfly unit is responsive to the local control circuitry to operate in multiple modes for operations involving fully homomorphic encryption.

In yet another embodiment, the NTT butterfly unit is responsive to the local control circuitry to operate in multiple modes for operations involving partially homomorphic encryption.

In another embodiment, a first configuration for the NTT butterfly unit employs first circuitry to carry out a first ciphertext (Ctxt) function. A second configuration for the NTT butterfly unit reuses at least a portion of the first circuitry to carry out a second Ctxt function.

In another embodiment, the first circuitry carries out a ciphertext ($C_{txt}$) addition function while the second $C_{txt}$ function comprises a $C_{txt}$ multiplication function.

In yet another embodiment, the first circuitry includes a modular adder.

In another embodiment, the modular adder comprises a combinational modular adder.

In another embodiment, the modular adder comprises a sequential modular adder.

In yet another embodiment, the second configuration includes second circuitry comprising a modular multiplier.

In a further embodiment, the modular multiplier comprises a parallel integer multiplier.

In another embodiment, the modular multiplier further comprises a modular reduction unit.

In yet another embodiment, the IC homomorphic processor includes multiple processor slices and the IC homomorphic processor further includes master control circuitry to interface the multiple processor slices with external memory via an external processor interface.

In a further embodiment, the local control circuitry receives instructions from the master control circuitry to retrieve a set of Ctxt coefficient values from the memory. The set of values is then loaded into a processing pipeline. At least one Ctxt operation is performed to generate transformed values. The transformed values are then stored to a destination memory location.

In another embodiment, the instructions from the master control circuitry further include instructions to perform NTT transformations on the loaded set of values to generate corresponding transformed values in the NTT domain.

In a further embodiment, the instructions from the master control circuitry to perform at least one Ctxt operation includes instructions to perform at least one Ctxt operation from the group consisting of addition operation, subtraction operation, multiplication operation, XOR operation, XNOR operation, AND operation, equality operation, smaller than operation, larger than operation, identity operation, copy operation and negation operation.

In yet another embodiment, the NTT butterfly unit is realized as a single-stage unit.

In a further embodiment, a homomorphic encryption system is disclosed. The homomorphic encryption system includes an integrated circuit (IC) homomorphic processor chip, and main memory external to the IC homomorphic processor chip. A data path transfers data between the main memory and the IC homomorphic processor chip. A control path controls the transfers between the main memory and the IC homomorphic processor chip. The IC homomorphic processor chip includes master control circuitry and multiple processor slices. The master control circuitry controls the transfers of data between the main memory and the IC homomorphic processor chip via the control path. The multiple processor slices correspond to a pipeline depth. Each of the multiple processor slices include local control circuitry, a number theoretic transform (NTT) butterfly unit, and on-chip memory. The NTT butterfly unit is responsive to the local control circuitry to operate in multiple modes for performing operations on encrypted data using homomorphic encryption. Each mode is associated with a different configuration of the NTT butterfly unit. The on-chip memory is coupled to the local control circuitry and the NTT butterfly unit.

In another embodiment, the homomorphic encryption comprises fully homomorphic encryption.

In yet another embodiment, the homomorphic encryption comprises partially homomorphic encryption.

In a further embodiment, the master control circuitry schedules operations for each of the multiple processor slices to retrieve a set of Ctxt coefficient values from the external memory and load the set of values into a processing pipeline. At least one Ctxt operation is performed to generate transformed values. The transformed values are then stored to a destination memory location.

In another embodiment, the scheduled operations from the master control circuitry further include scheduled operations for each of the multiple processor slices to perform NTT transformations on the loaded set of values to generate corresponding transformed values in the NTT domain.

In yet another embodiment, the scheduled operations from the master control circuitry further comprises scheduled operations for each of the multiple processor slices to perform at least one Ctxt operation from the group consisting of addition operation, subtraction operation, multiplication operation, XOR operation, XNOR operation, AND operation, equality operation, smaller than operation, larger than operation, identity operation, copy operation and negation operation.

In another embodiment, each of the NTT butterfly units comprises a single-stage butterfly, and a given NTT transformation operation involves an initial NTT step followed by $\log_2(n)-1$ stages of evaluation by the NTT butterfly unit, where "n" represents a degree of a polynomial associated with the coefficient values.

In yet another embodiment, a number theoretic transform (NTT) butterfly circuit is disclosed. The NTT butterfly circuit includes a high input word path including a first adder/subtractor, a first multiplier, and first selection circuitry. The first selection circuitry is coupled to the first adder/subtractor and the first multiplier and includes respective bypass paths to selectively bypass the first adder/subtractor and the first multiplier. The NTT butterfly circuit includes a low input word path including a second adder/subtractor, a second multiplier, and second selection circuitry. The second selection circuitry is coupled to the second adder/subtractor and the second multiplier and includes respective bypass paths to selectively bypass the second adder/subtractor and the second multiplier. The high and low input word paths are cross-coupled, and the first and second selection circuitry is responsive to different mode control signals to reconfigure the low and high input word paths into different logic processing units.

In a further embodiment, a first configuration for the NTT butterfly circuit employs first circuitry to carry out a ciphertext (Ctxt) addition function, and a second configuration for the NTT butterfly circuit reuses at least a portion of the first circuitry to carry out a Ctxt multiplication function.

In yet another embodiment, each of the first and second adder/subtractors comprises a combinational modular adder.

In another embodiment, each of the first and second multipliers comprises a parallel integer multiplier.

In a further embodiment, each of the first and second multipliers further includes a modular reduction unit.

In yet another embodiment, each of the first and second adder/subtractors and multipliers includes associated critical paths, and each of the associated critical paths is bounded by register circuitry.

In another embodiment, the NTT butterfly circuit is realized as a single-stage butterfly, and a given NTT transformation operation involves an initial NTT step followed by $\log_2(n)-1$ stages of evaluation by the NTT butterfly circuit, where "n" represents a degree of a polynomial associated with the coefficient values.

In a further embodiment, a method of operation in a homomorphic processor integrated circuit (IC) chip is disclosed. The method includes transforming ciphertext (Ctxt) symbols into a number theoretic transform (NTT) domain. The transforming includes, for a given processor slice, generating a mode control signal with local control circuitry. The mode control signal corresponds to one of multiple modes of operations involving homomorphic encryption. The NTT butterfly unit is configured in response to the mode control signal.

In yet another embodiment, the homomorphic encryption comprises fully homomorphic encryption.

In another embodiment, the homomorphic encryption comprises partially homomorphic encryption.

In a further embodiment, the mode control signal comprises a first mode control signal corresponding to a first mode of operation, and the NTT butterfly unit responds to the first mode control signal by configuring the NTT butterfly unit to carry out a Ctxt addition function.

In another embodiment, the mode control signal includes a second mode control signal corresponding to a second mode of operation, and wherein the NTT butterfly unit responds to the second mode control signal by configuring the NTT butterfly unit to carry out a Ctxt multiplication function. A portion of the NTT butterfly unit employed in the addition function is reused to carry out the multiplication function.

In another embodiment, the transforming includes operating multiple processor slices in parallel, such that each processor slice includes a copy of the local control circuitry and a copy of the NTT butterfly unit.

In yet another embodiment, the method further includes pipelining multiple operations carried out by the multiple processor slices.

In a further embodiment, the method further includes interfacing the multiple processor slices with external memory via an external processor interface, the interfacing controlled by master control circuitry.

In yet another embodiment, the master control circuitry generates instructions for the local control circuitry of the multiple slices. The local control circuitry responds to the instructions to carry out steps including retrieving a set of Ctxt coefficient values from the memory; loading the set of values into a processing pipeline; performing at least one Ctxt operation to generate transformed values; and storing the transformed values to a destination location in the external memory.

In another embodiment, the method further includes performing NTT transformations on the loaded set of values to generate corresponding transformed values in the NTT domain.

In yet another embodiment, the at least one Ctxt operation is selected from the group consisting of addition operation, subtraction operation, multiplication operation, XOR operation, XNOR operation, AND operation, equality operation, smaller than operation, larger than operation, identity operation, copy operation and negation operation.

In a further embodiment, a method of operation in a homomorphic encryption system is disclosed. The method includes providing a homomorphic processor integrated circuit (IC) chip including a configurable number theoretic transform (NTT) butterfly unit. The homomorphic processor IC chip interfaces with external memory via a data path and a control path. Ciphertext (Ctxt) symbols are transformed into an NTT domain. The transforming includes, for a given processor slice, generating a mode control signal with local control circuitry. The mode control signal corresponds to one of multiple modes of operations involving homomorphic encryption. The NTT butterfly unit is configured in response to the mode control signal.

In yet another embodiment, the homomorphic encryption comprises fully homomorphic encryption.

In a further embodiment, the homomorphic encryption comprises partially homomorphic encryption.

In another embodiment, the mode control signal comprises a first mode control signal corresponding to a first mode of operation, and the NTT butterfly unit responds to the first mode control signal by configuring the NTT butterfly unit to carry out a Ctxt addition function.

In yet another embodiment, the mode control signal comprises a second mode control signal corresponding to a second mode of operation, and the NTT butterfly unit responds to the second mode control signal by configuring the NTT butterfly unit to carry out a Ctxt multiplication function. A portion of the NTT butterfly unit employed in the addition function is reused to carry out the multiplication function.

In another embodiment, the transforming includes operating multiple processor slices in parallel, such that each processor slice includes a copy of the local control circuitry and a copy of the NTT butterfly unit.

In another embodiment, the method further includes pipelining multiple operations carried out by the multiple processor slices.

In yet another embodiment, the method further includes interfacing the multiple processor slices with external memory via an external processor interface, the interfacing controlled by master control circuitry.

In another embodiment, the master control circuitry generates instructions for the local control circuitry of the multiple slices. The local control circuitry responds to the instructions to carry out steps including retrieving a set of Ctxt coefficient values from the memory; loading the set of values into a processing pipeline; performing at least one Ctxt operation to generate transformed values; and storing the transformed values to a destination location in the external memory.

In another embodiment, the method further includes performing NTT transformations on the loaded set of values to generate corresponding transformed values in the NTT domain.

In yet another embodiment, the at least one Ctxt operation is selected from the group consisting of addition operation, subtraction operation, multiplication operation, XOR operation, XNOR operation, AND operation, equality operation, smaller than operation, larger than operation, identity operation, copy operation and negation operation.

In another embodiment, a method of operation in a number theoretic transform (NTT) butterfly circuit is disclosed. The circuit includes a high input word path and a low input word path. The high input word path includes a first adder/subtractor, and a first multiplier. The low input word path includes a second adder/subtractor, and a second multiplier. The method includes selectively bypassing the second adder/subtractor and the second multiplier; and reconfiguring the low and high input word paths into different logic processing units in response to different mode control signals.

In a further embodiment, the reconfiguring includes, in response to receiving a first mode control signal, configuring the NTT butterfly circuit to carry out a ciphertext (Ctxt) addition function, and, in response to receiving a second mode control signal, configuring the NTT butterfly circuit to carry out a Ctxt multiplication function.

In another embodiment, the method further includes employing a combinational modular adder for each of the first and second adder/subtractors.

In yet another embodiment, the method further includes employing a parallel integer multiplier for each of the first and second multipliers.

In a further embodiment, each of the first and second multipliers includes a reduction unit, and the method further includes operating each reduction unit.

In another embodiment, the NTT butterfly circuit is realized as a single-stage butterfly, and the transforming includes operating the NTT butterfly circuit through an initial NTT stage of evaluation followed by $\log_2(n)-1$ stages of evaluation, where "n" represents a degree of a polynomial associated with coefficient values.

In yet another embodiment, a homomorphic processor integrated circuit (IC) chip is disclosed. The IC homomorphic processor chip includes at least one processor slice. The at least one processor slice includes local control circuitry, an NTT butterfly unit, and on-chip memory. The on-chip memory is coupled to the control circuitry and the NTT butterfly unit and is partitioned into separately accessible storage units for homomorphic processing functions. The on-chip memory includes multiple input/output (I/O) storage units, a bit decomposed polynomial storage unit, and a twiddle factor memory unit.

In another embodiment, a first one of the I/O storage units stores ciphertexts (Ctxts) in a row-by-row format, and a second one of the I/O storage units stores Ctxts in a column-by-column format.

In yet another embodiment, a third one of the I/O storage units stores output Ctxts resulting from a multiplication operation involving a first Ctxt from the first storage unit multiplied with a second Ctxt from the second storage unit.

In a further embodiment, the homomorphic processor integrated circuit (IC) chip further includes a memory counter coupled to the second memory unit.

In another embodiment, a single row transformation of a Ctxt in a given row of the first one of the I/O storage units results in a corresponding resulting row in the third one of the I/O storage units.

In yet another embodiment, one of the multiple I/O storage units is configured as a ping-pong memory coupled to an external memory.

In a further embodiment, the ping-pong memory includes a first sub-array to carry out a first memory operation, and a second sub-array to carry out a second operation concurrent with the first memory operation.

In another embodiment, the on-chip memory comprises DRAM.

In a further embodiment, a method of operation in a homomorphic processor integrated circuit (IC) chip is disclosed. The method includes partitioning on-chip memory into separately accessible storage units for homomorphic processing functions. The on-chip memory includes multiple input/output (I/O) storage units, a bit decomposed polynomial storage unit, and a twiddle factor memory unit.

At least one ciphertext (Ctxt) operation is performed on a loaded set of values with a configurable number theoretic transform (NTT) butterfly unit coupled to the partitioned on-chip memory.

In another embodiment, the method further includes transforming the loaded set of values to generate corresponding transformed values in the NTT domain.

In another embodiment, the at least one Ctxt operation is selected from the group consisting of addition operation, subtraction operation, multiplication operation, XOR operation, XNOR operation, AND operation, equality operation, smaller than operation, larger than operation, identity operation, copy operation and negation operation.

In a further embodiment, the transforming further includes reading a first ciphertext (Ctxt) from a first one of the I/O storage units in a row-by-row format, and reading a second Ctxt from a second one of the I/O storage units in a column-by-column format.

In another embodiment, the transforming further includes multiplying the first Ctxt with the second Ctxt to generate a resulting Ctxt, and writing the resulting Ctxt into a third one of the I/O storage units.

In a further embodiment, one of the multiple I/O storage units includes respective first and second sub-arrays configured as a ping-pong memory unit. The method further includes operating the first sub-array to carry out a first operation, and operating the second sub-array to carry out a second operation concurrent with the first operation.

In another embodiment, a method of operation in a homomorphic processor integrated circuit (IC) chip is disclosed. The method includes retrieving a first ciphertext (Ctxt) from a first on-chip memory unit via a row format read operation. The first Ctxt is transformed into a number theoretic transform (NTT) domain. A second ciphertext (Ctxt) is retrieved from a second on-chip memory unit via a column format read operation. The second Ctxt is transformed into the NTT domain. The transformed first Ctxt is multiplied with the transformed second Ctxt to generate a resulting Ctxt. The resulting Ctxt is stored in a third memory unit.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 1C illustrates a further embodiment of a system similar to FIG. 1A.

DETAILED DESCRIPTION

Hardware accelerators and associated methods are disclosed. In one embodiment, an integrated circuit (IC) homomorphic processor chip for transforming ciphertext ($C_{txt}$) symbols into a number theoretic transform (NTT) domain is disclosed. The IC homomorphic processor chip includes at least one processor slice. Each processor slice includes local control circuitry, NTT butterfly unit, and on-chip memory. The NTT butterfly unit is responsive to the local control circuitry to operate in multiple modes for operations involving fully homomorphic encryption. Each mode is associated with a different configuration of the NTT butterfly unit. By utilizing reconfigurable NTT butterfly unit, separate circuits to accomplish the different functions may be avoided, contributing to more efficient cycle times.

Figure 1A:
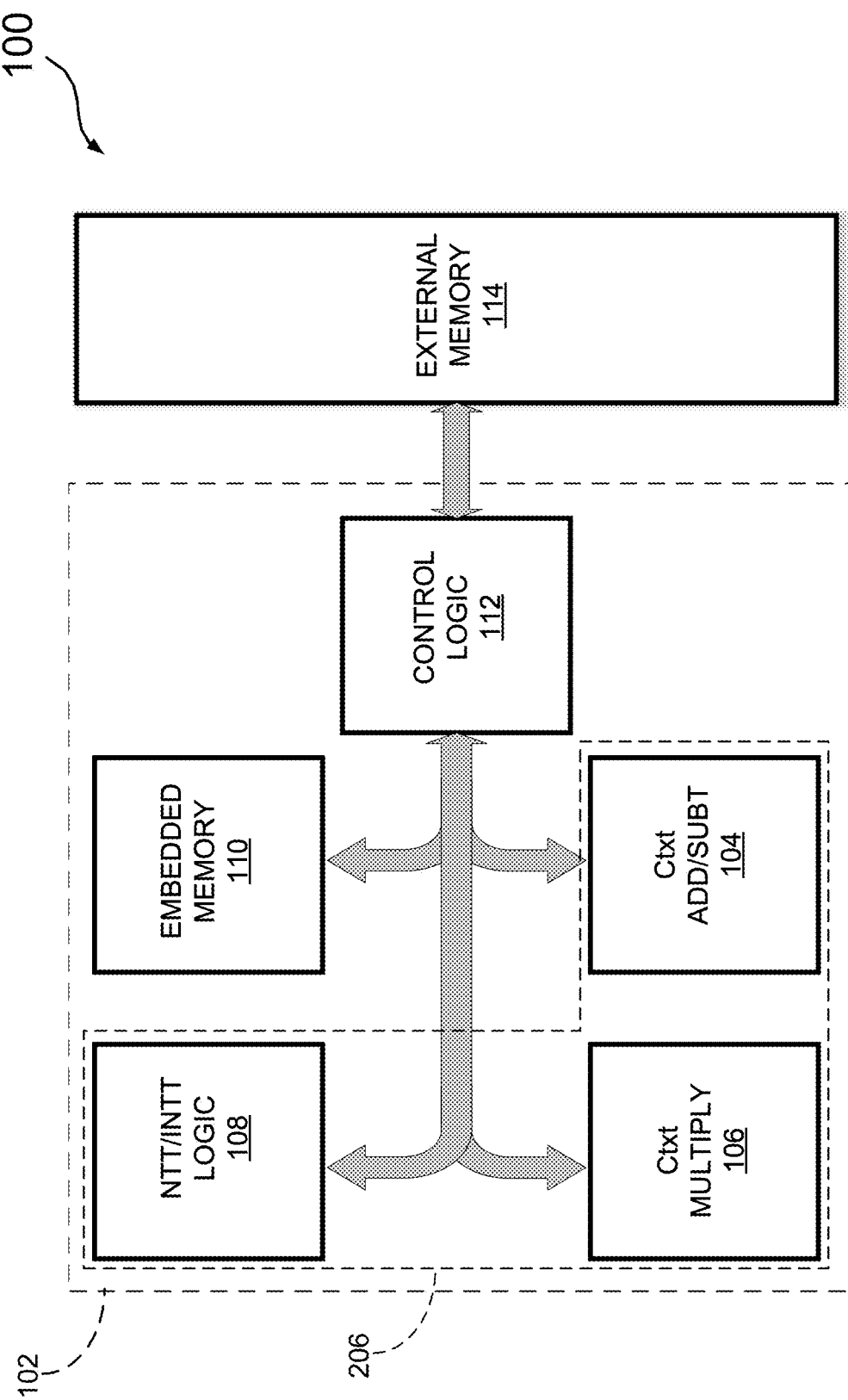
FIG. 1A illustrates one embodiment of a homomorphic encryption system.

Referring to FIG. 1A, one embodiment of a fully homomorphic encryption (FHE) system, generally designated 100, employs an integrated circuit (IC) homomorphic processing unit (HPU) 102. The HPU 102 includes an on-chip ciphertext (Ctxt) add/subtract unit 104, and a multiplier unit 106. A Number Theoretic Transform (NTT) unit 108 assists in the Ctxt multiplication. For one embodiment, the add/subtract unit 104, the multiplier unit 106, and the NTT unit cooperate to form a multifunctional butterfly unit 206. Embedded memory 110 is provided to feed data to the computing engines in an optimal fashion. In addition, the system 100 employs a control unit 112 to orchestrate engine operation and to control data transfers to and from an external memory 114. This general architecture provides a cycle accurate homomorphic processing unit (HPU) that offers hardware acceleration for the computation of homomorphic operations (for Ring-based FHE encryption schemes) faster than current state-of-the-art GPUs by, for example, 57× (based on various parameters) using a fraction of the die area exhibited by conventional schemes, such as graphics processing units (GPUs).

Figure 1B:
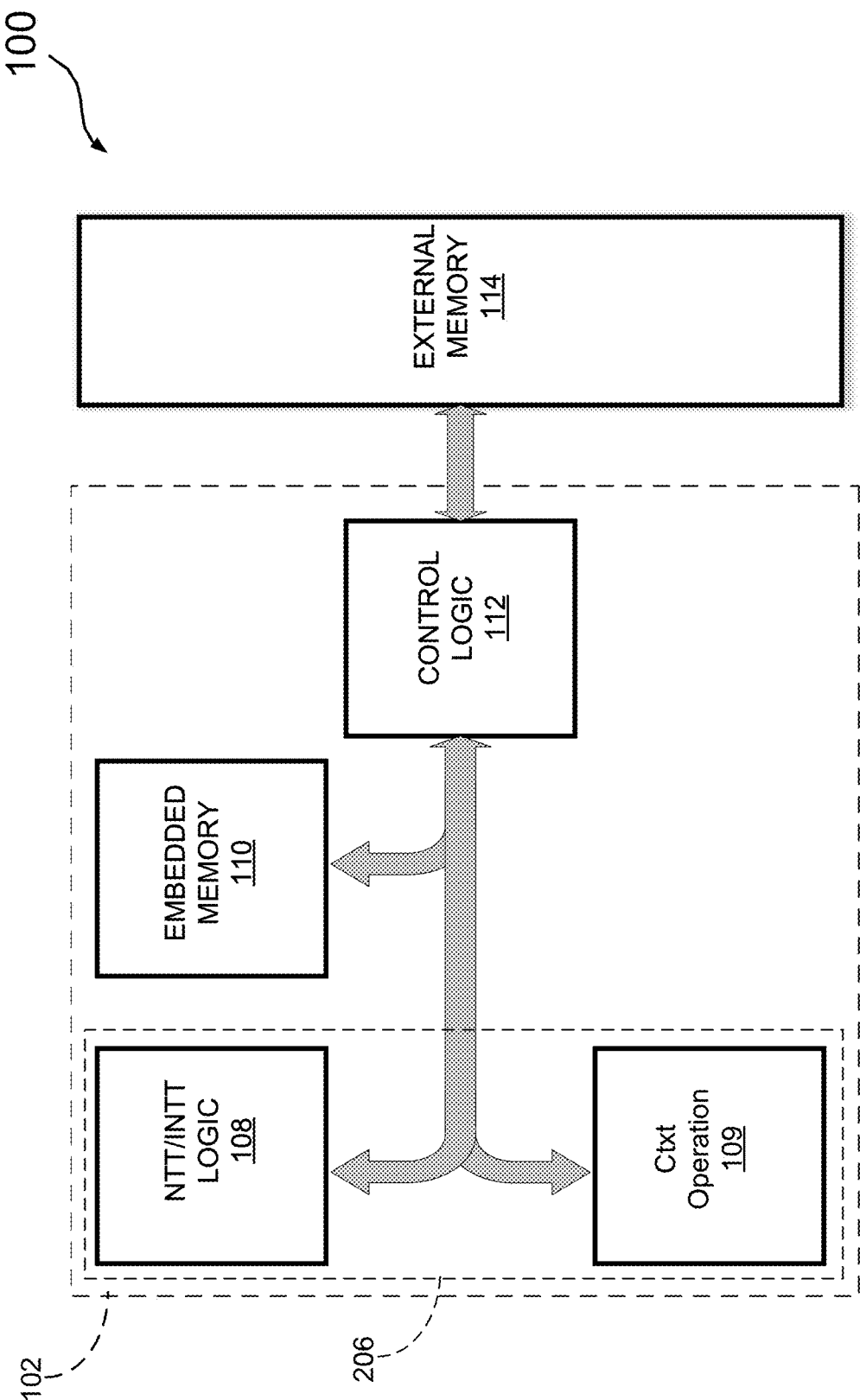
FIG. 1B illustrates an embodiment of a system similar to FIG. 1A.

For some embodiments, the multifunctional butterfly unit 206 may take different forms to perform different functions, depending on the application. FIG. 1B illustrates the multifunctional butterfly unit 206 as including NTT/INTT unit 108, and Ctxt Operation circuitry 109 to carry out at least one of a variety of Ctxt operations. Examples of such operations include addition, subtraction, multiplication, XOR, XNOR, AND, equality, smaller than, larger than, identity, copy, and negation.

In one embodiment, illustrated in FIG. 1C, the multifunctional butterfly unit 206 includes the Ctxt Operation circuitry 109 to carry out at least one of the variety of Ctxt operations noted above.

Figure 2:
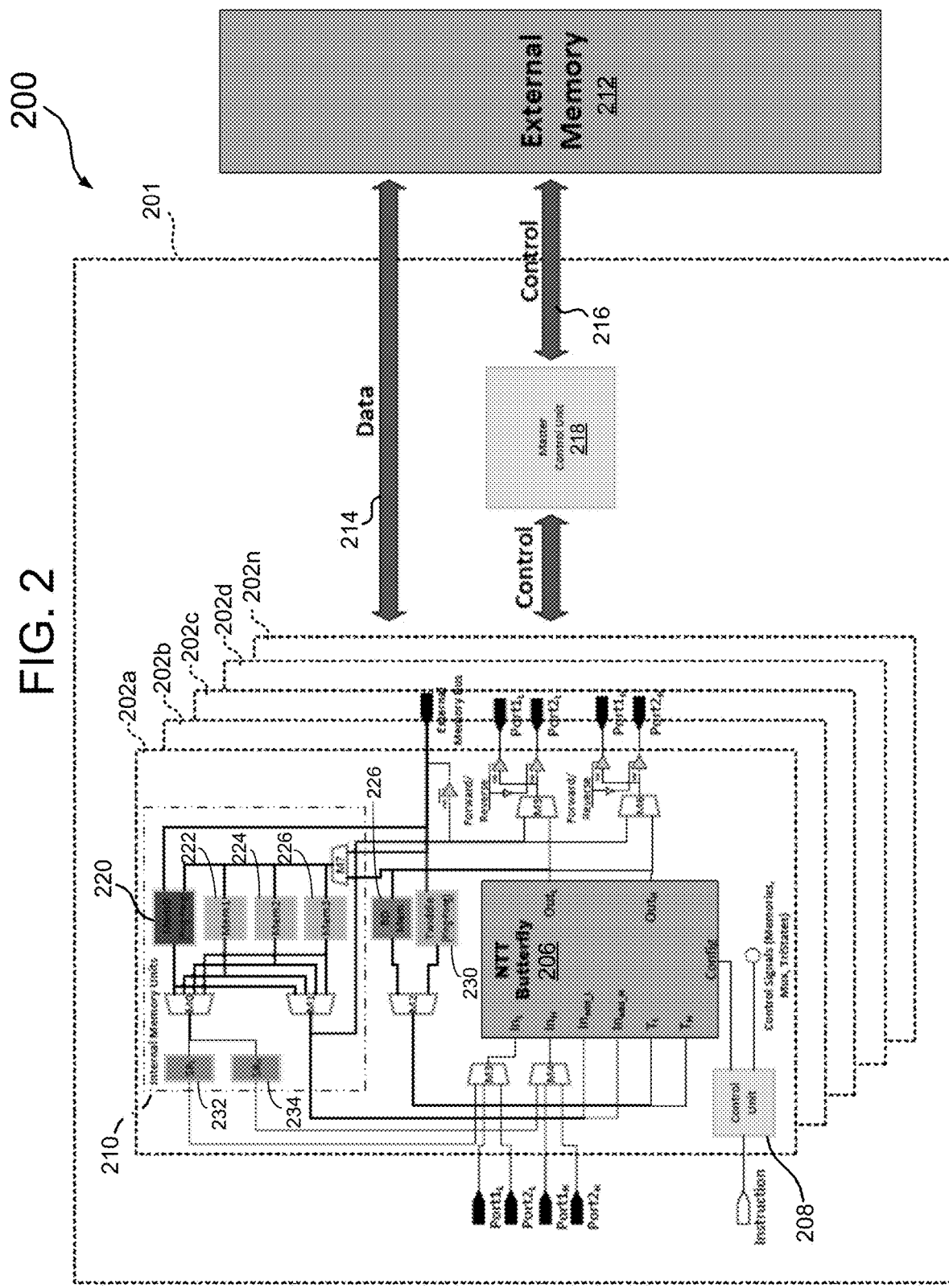
FIG. 2 illustrates further detail of the homomorphic encryption system shown in FIG. 1.

FIG. 2 illustrates further detail of one specific embodiment of an FHE system, generally designated 200, that corresponds to the system shown in FIG. 1. The system 200 includes an integrated circuit (IC) chip 201, such as an application specific integrated circuit (ASIC) formed with multiple "slices" of logic 202a-202n that are capable of operating in parallel to maximize processing speed and efficiency. Each slice, such as at 202a, defines a homomorphic processing unit (HPU) core block with a multifunctional NTT butterfly unit 206. The multifunctional butterfly unit 206 is reconfigurable, and controlled by distributed control logic in the form of a local control unit 208. An internal embedded memory architecture 210 exhibits a greatly-reduced footprint while minimizing latency. External memory 212 interfaces with the HPU core slices 202 via a data path 214 and a control path 216. The control path 216 includes a master control unit 218 to orchestrate operation of the system 200 at a global level.

Further referring to FIG. 2, the HPU core slices 202 may be scalable in nature to make the integration of a larger system a straightforward task, with a much simplified master control unit 218. Core input/outputs (I/Os), such as "Port1L", "Port1H" and "Port2L" and "Port2H" are configured on both sides of each HPU core slice 202. Both "H" and "L" ports are capable of being input and output ports to the HPU core slice. This is advantageous since an inverse number theoretic transform (INTT) engine, which transforms NTT-domain data into ciphertext data, may use hardware similar to the NTT hardware, but with in-place horizontal flipping. In effect, the same NTT engine may compute an INTT function if the output ports are used as input ports and vice versa. This also reduces the routing resources for an NTT engine by half, which correspondingly minimizes design area and power dissipation.

Further referring to FIG. 2, the internal embedded memory 210 is provided to efficiently load the HPU core slice 202 in a manner that minimizes overall chip footprint and processing latency. For one embodiment, the internal memory 210 is partitioned in a manner that not only minimizes the amount of on-chip memory, but also minimizes processing latency in the system. Generally, the partitioning involves four memory units Mem0 (220), Mem1 (222), Mem2 (224), and Mem3 (226) for input/output (I/O) storage, one memory unit 228 for temporary storage of "bit decomposed" (BD) polynomials, and a twiddle factor memory unit 230. A pair of shift registers 232 and 234 connected to the memory units 220, 222, 224, and 226, and are selectively coupled to the HPU high and low inputs via multiplexers M3 and M4. One of the four I/O memory units, such as Mem0, may be configured as a dual-buffer "ping-pong" memory to effectively hide a delay associated with ciphertext loads from the external memory 212. In some embodiments, the twiddle factor memory unit 230 may also be configured in a ping-pong orientation.

To further aid in compensating for ciphertext load delays, the data path 214 that interfaces the internal memory 210 with the external memory 212 may have a width that satisfies a condition where the number of clock cycles for a Ctxt load instruction is less than the number of clock cycles to carry out a Ctxt operation, e.g., not limited to Ctxt operations such as addition operation, subtraction operation, multiplication operation, XOR operation, XNOR operation, AND operation, equality operation, smaller than operation, larger than operation, identity operation, copy operation, negation operation. To further improve performance by supplying the data path with new data every clock cycle, in one embodiment, the external memory interface employs fast dynamic random access memory (DRAM), such as that defined under any one of the various DDRX and/or GDDRX memory standards. Operation of the system, including various methods carried out by the memory architecture, is described further below.

Figure 3:
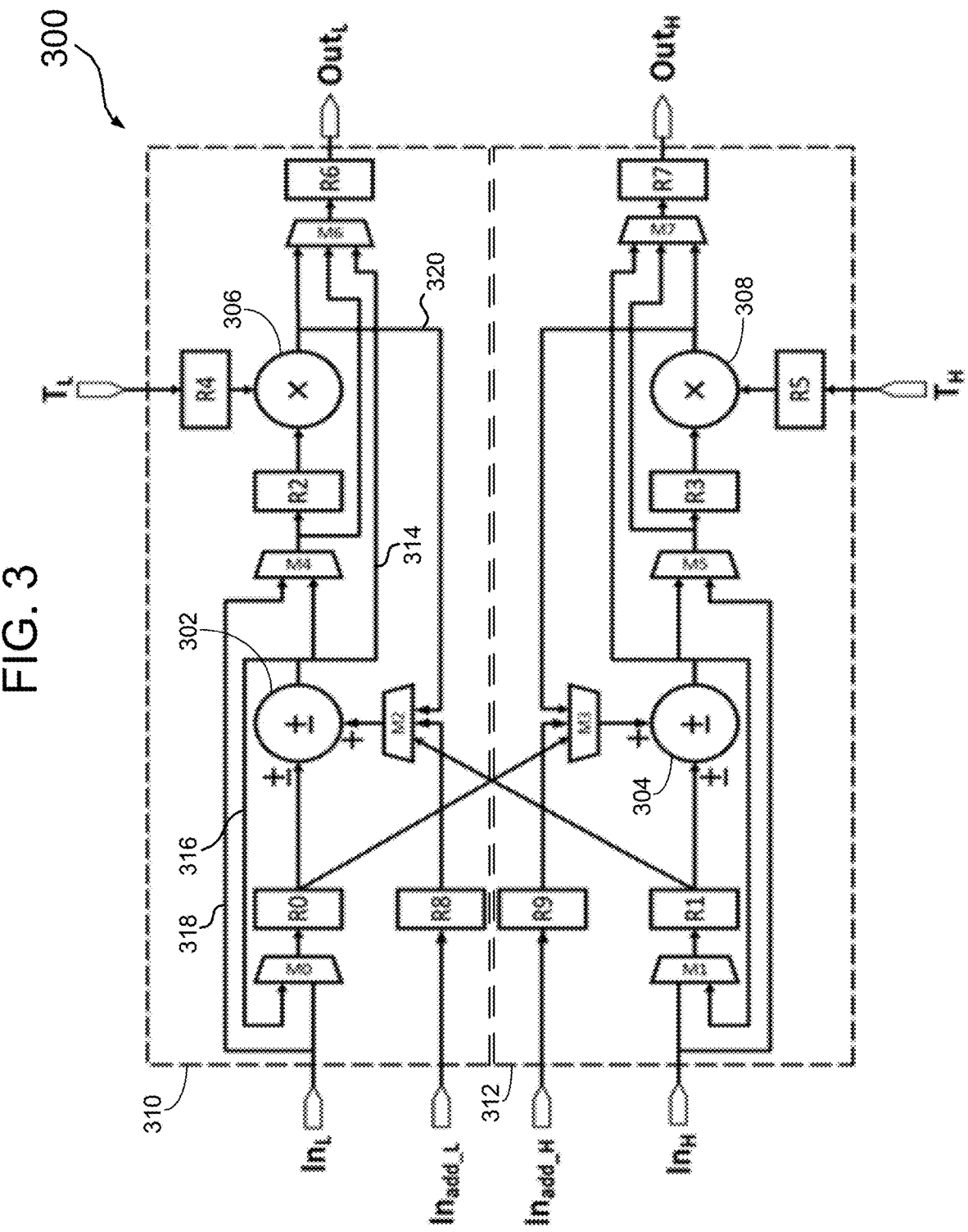
FIG. 3 illustrates one embodiment of the configurable NTT/INTT unit of FIG. 2.

FIG. 3 illustrates one specific embodiment of a multifunctional butterfly unit, generally designated 300, that corresponds to the NTT butterfly unit 206 of FIG. 2. In general, the multifunctional butterfly unit 300 provides circuitry for transforming ciphertexts ($C_{txt}$) into number theoretic transforms (NTTs). For certain embodiments, the unit may also serve as an INTT engine to transform NTTs back to ciphertexts. Generally, a number theoretic transform (NTT) is a finite-field equivalent of a discrete Fourier transform (DFT). An NTT reduces the computational cost of polynomial multiplication from $O(n^2)$, for degree n polynomials, to $O(n \log(n))$.

Further referring to FIG. 3, as an essential building block, the multifunctional butterfly unit 300 generally includes two modular adders 302 and 304 and two modular multipliers 306 and 308 arranged in a butterfly topology. The modular adders may be combinational or sequential, depending on the application. Generally speaking, a single radix-2 butterfly has the general formula:

$$\text{Out}_L = (T_L(\text{In}_L + \text{In}_H)) \bmod q$$

$$\text{Out}_H = (T_H(\text{In}_L - \text{In}_H)) \bmod q$$

where $T_L$ and $T_H$ are called twiddle factors, and q is the modulus.

For one embodiment, the NTT butterfly unit 300 provides for reconfigurability and reuse of various logic blocks to accomplish multiple functions utilized in FHE encryption. The NTT butterfly unit 300 thus includes the modular adder/subtractor logic 302 and 304, as well as modular multiplier logic 306 and 308. The modular adder/subtractor unit generally consists of two parts, a regular add/subtract unit followed by a modular reduction unit. The modular reduction operation checks if the result is more than a modulus q, in case of addition, or less than 0, in case of subtraction, and adjusts the result accordingly. For some embodiments, parallel adders like Carry Look-Ahead, Parallel Prefix, Conditional Sum, or Carry Skip adders may be employed.

Further referring to FIG. 3, each of the modular multipliers 306 and 308 can either be configured as a single unit or an integer multiplier followed by a modular reduction unit. The modular reduction unit may be in the form of a Barrett modular reduction unit, a special prime modular reduction unit, or as a single unit which unifies both units such as a Montgomery modular multiplication unit. Since the modular multiplier occupies a large portion of the multifunctional butterfly, which may be repeated many times in certain embodiments, certain implementations may be more desirable in certain contexts than others. For one embodiment, the use of special primes with a modulus from the Solinas primes works well, with $q = 2^\ell - 2^d + 1$, where $\ell = 31$, $d = 17$, and q representing the modulus. To improve the performance of the system, a parallel integer multiplier may be employed. With the parameters defined above, the integer multiplier results in an output width of $2\ell = 62$ bits. This is twice the value of $\ell$, which is then reduced by the reduction unit back to the 31 bits.

With continued reference to FIG. 3, the multifunctional butterfly unit 300 incorporates the conceptual modular adders and modular multipliers described above into respective low and high processing paths 310 and 312 that are selectably cross-coupled in certain modes of operation to efficiently enable logic reusability for various add/subtract/ multiply/copy and other computing functions. The low processing path 310 includes a first stage of logic including multiplexer M0 and registers R0 and R8. Multiplexer M0 receives a first input $In_L$ provided to the butterfly, and a second input fed back from adder/subtractor 302. Register R0 receives a selected output from M0, while register R8 receives a second input $Inadd_L$. The registers R0 and R8 provide a first stage of latches or registers to pipeline the low input signals for the NTT operations. The adder/subtractor 302 receives various inputs, selected by local control logic depending on the function being carried out. The various inputs to the adder/subtractor 302 may include the output from register R0, and a selected output from M2 originating from register R8, or feedback from multiplier 306, or a cross-coupled output from register R1 (from the corresponding high path 312).

Further referring to FIG. 3, the output from the adder/subtractor 302 feeds a multiplication path including one input of multiplexer M4. A bypass path 314 feeds the addition/subtraction output to output multiplexer M6, and also along feedback path 316 to the input multiplexer M0. The multiplier multiplexer M4 includes a second input from a bypass path 318 that directly connects the input $In_L$ to the multiplier path, bypassing the addition/subtractor path. A second stage register R2 receives a selected output from M4, and provides it to the multiplier 306. A twiddle-factor input may also be applied to the multiplier 306 via an input $T_L$ through register R4. The output of the multiplier 306 may then be fed to output multiplexer M6, and also fed back for selective input to the adder/subtractor 302 along path 320 to multiplexer M2. A third stage register R6 receives a selected output from multiplexer M6, and feeds output pad $Out_L$ with the processed output.

With continued reference to FIG. 3, the low path 310 described above may be duplicated by the high path 312, with first stage registers R1 and R9 operating synchronously with registers R0 and R8, with similar pipelined timing carried out between registers R3/R2 and R7/R6. As noted above, the low and high paths 310 and 312 are cross-coupled between register R0 and multiplexer M3, and register R1 and multiplexer M2. The cross-coupling provides for functional reconfigurability and reusability of available logic in the butterfly for certain modes of operation as described in further detail below.

In operation, the FHE system 200 of FIG. 2 carries out computations including Ctxt addition, Ctxt subtraction, Ctxt multiplication and NTT/INTT processing. For some embodiments, plaintext computations may also be carried out. The manner in which certain operations are scheduled and handled, more fully described below, significantly improves performance by minimizing latency while contributing to a greatly reduced IC chip footprint.

Figure 4:
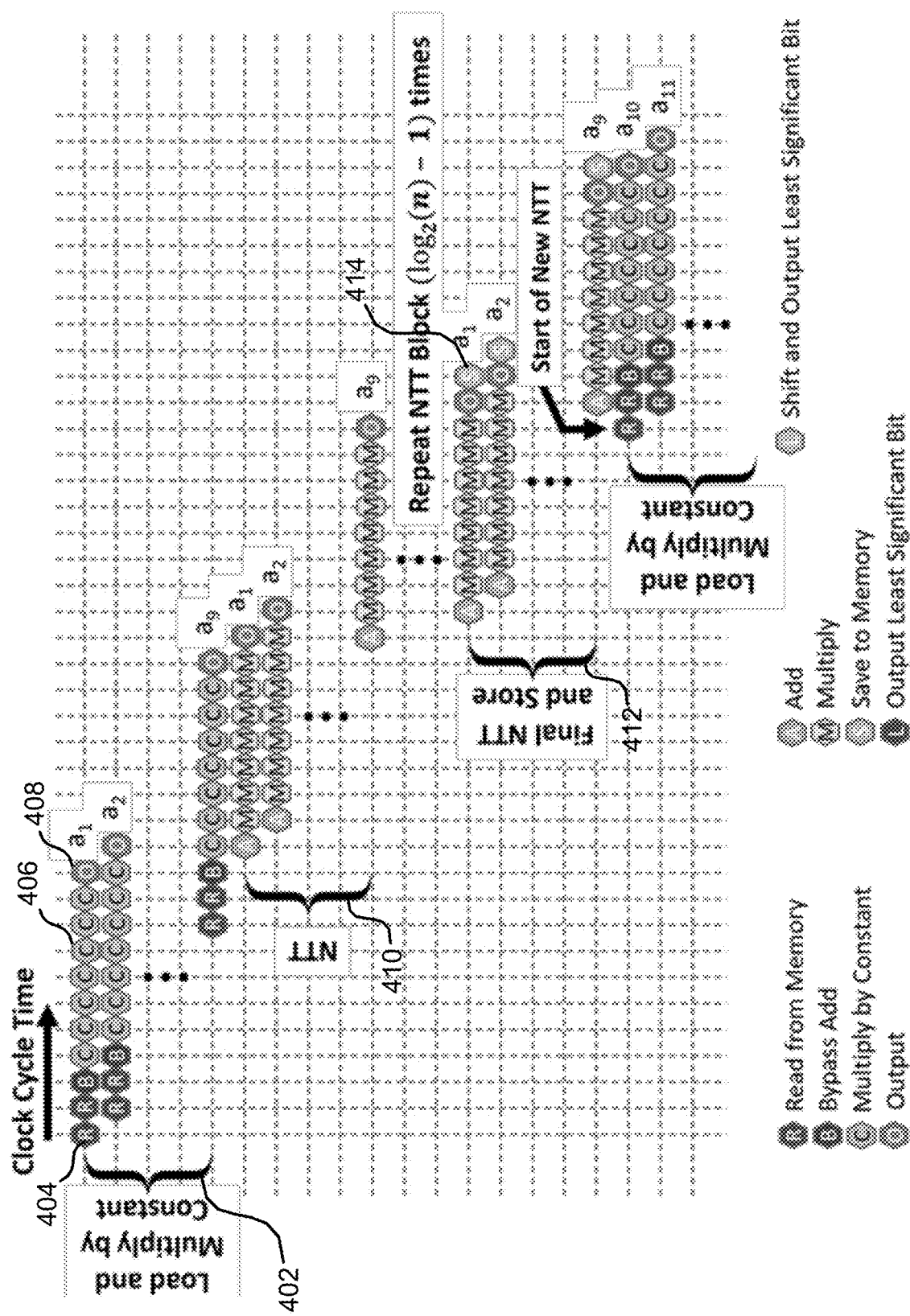
FIG. 4 shows a timing diagram of a forward NTT operation performed by the system of FIG. 2.

FIG. 4 illustrates a timing chart showing various timings associated with some of the general operations carried out by the system of FIG. 2. Groups of operations are shown, where each group involves a number of identical computations that are iteratively carried out by the multiple "slices" of the HPU logic, depending on the depth of the pipeline employed. Clock cycle time is reflected along the x-axis, going from left to right, where each hexagonal operation symbol represents an operation carried out in a single clock cycle.

Further referring to FIG. 4, as an example of a forward NTT operation, involving a transformation of ciphertexts into the NTT domain, three main processing functions are carried out: (1) load and multiply by a constant, (2) NTT, and (3) final NTT and store. The first operation (load and multiply by a constant), shown at 402, generally reads multiple polynomials from the internal memories, such as at 404, until the HPU core block pipeline is filled, and multiplies them by constant values, such as at 406. The output is then sent to the output ports, such as at 408. Note that the two cycles shown to read elements from the memory consist of one cycle to get the contents from the memory, followed by another cycle for the low and high shift registers 232 and 234 of FIG. 2. The delay per polynomial for this stage equals the pipeline depth plus two clock cycles for the load from memory operation.

With continued reference to FIG. 4, the NTT operation, shown at 410, itself iterates on the loaded polynomials in the pipeline and performs $\log_2(n)-1$ stages of evaluation. The delay per polynomial for this stage equals the pipeline depth. A final NTT operation, at 412, then takes place, after which the results are stored back to the destination memory, at 414. The effective delay per polynomial for this last stage equals the pipeline depth minus 2 clock cycles because the loading and transformation of the new set of polynomials starts while the previous computation is still in the pipeline, as demonstrated with the label "Start of New NTT". The three main processing functions are repeated until all the polynomials in the Ctxt are transformed. In the case of the inverse NTT (INTT) transform, the main processing functions are carried out similarly, except that the constant multiplication operation takes place after the butterfly operations.

Figure 5:
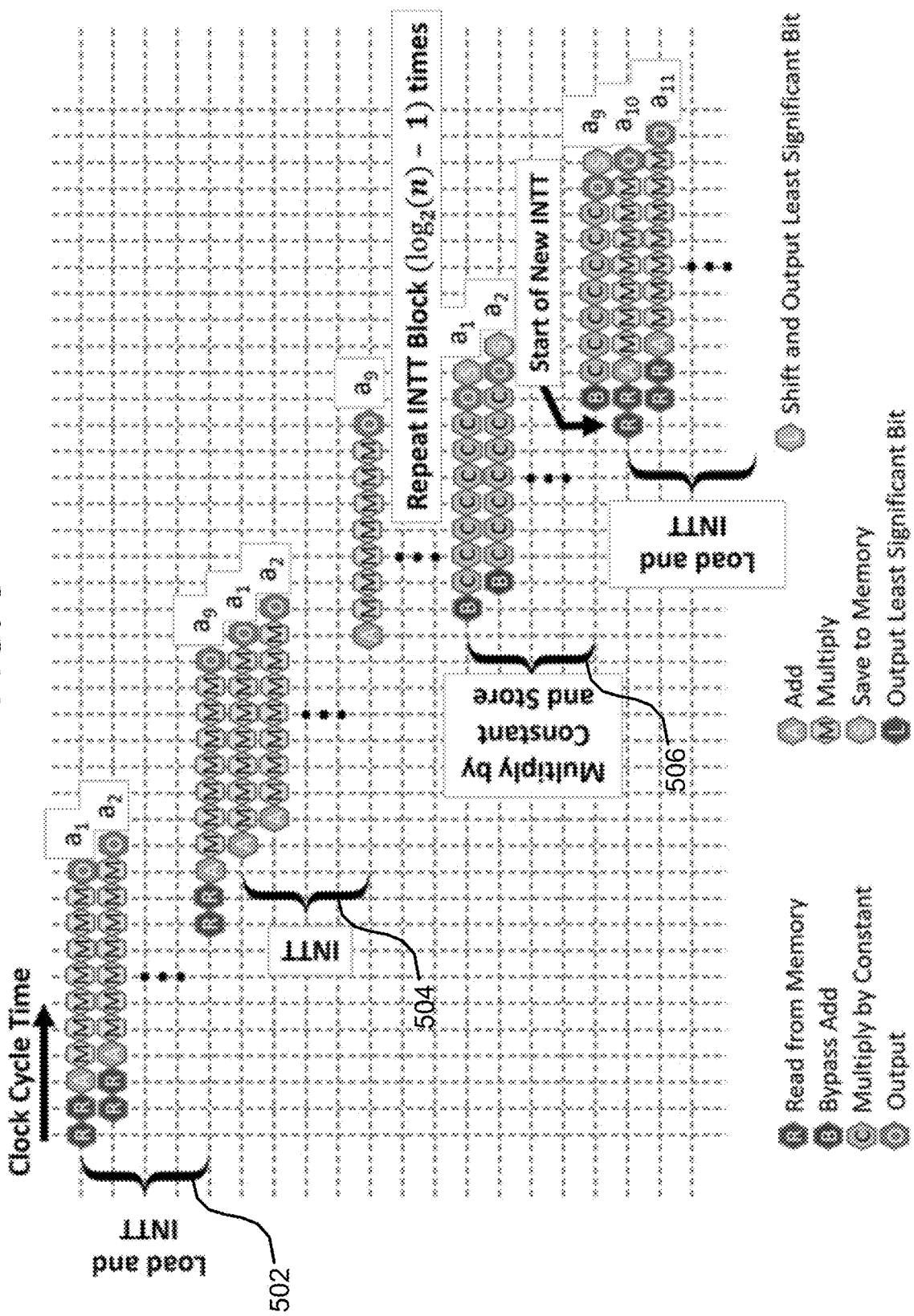
FIG. 5 shows a timing diagram of an inverse NTT (INTT) operation performed by the system of FIG. 2.

FIG. 5 illustrates the timing for an example of an INTT operation that is carried out similarly to the NTT operation of FIG. 4. In scheduling the INTT function, three main operations are performed: (1) load and perform INTT, at 502; (2) perform INTT, at 504; and (3) multiply by a constant and store, at 506.

Figure 6:
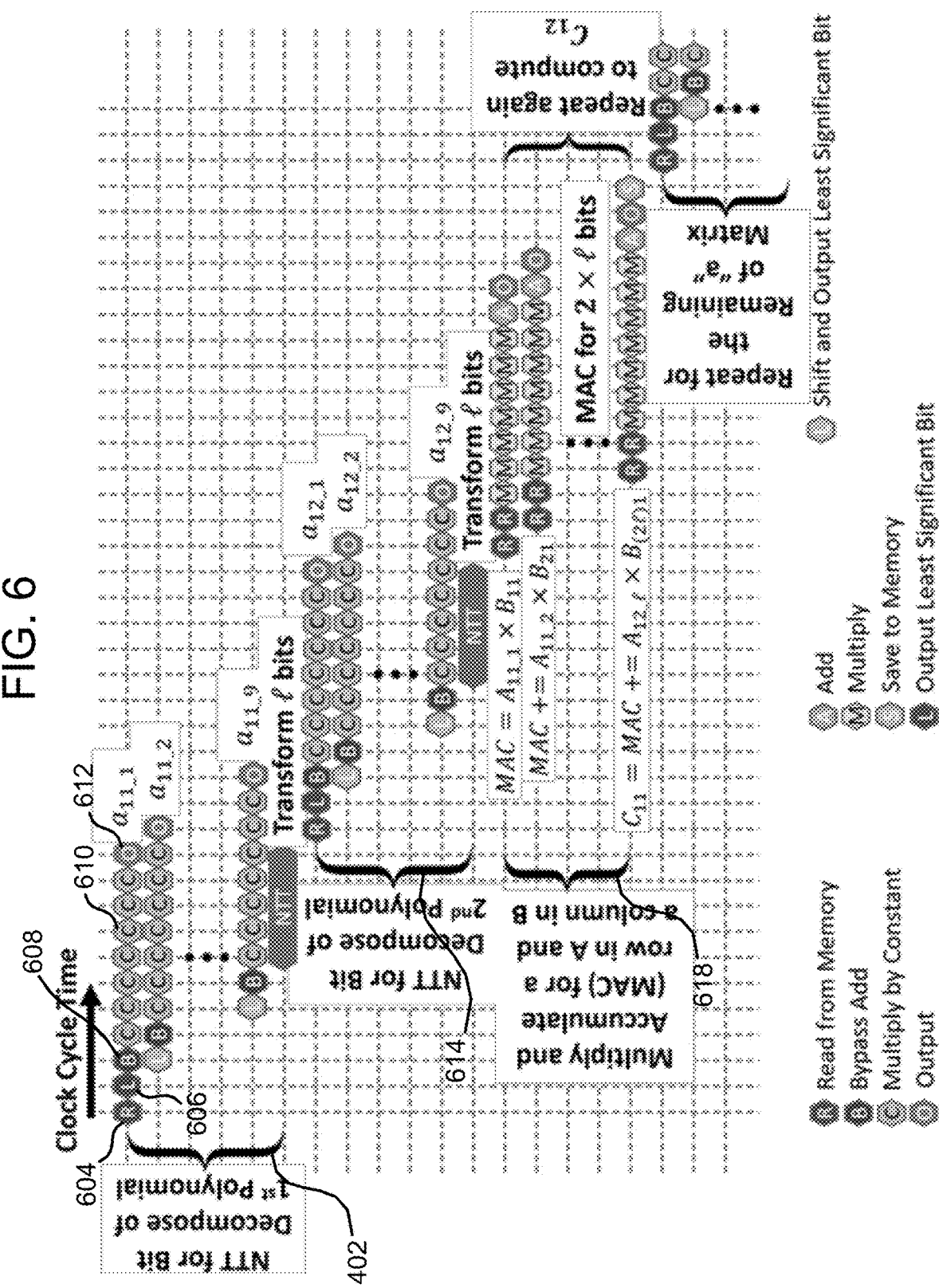
FIG. 6 illustrates a timing diagram of a multiply and accumulate operation.

While FIG. 4 illustrates the timing for an example of a forward NTT operation, FIG. 6 illustrates a timing chart for a ciphertext multiplication operation involving the multiplication of two ciphertexts—$Ctxt_1$ and $Ctxt_2$. Three main processing functions are carried out during the process: (1) NTT for the Bit Decompose of the first polynomial, at 602; (2) NTT for the Bit Decompose of the second polynomial, at 614; and (3) Multiply and Accumulate, at 618.

Further referring to FIG. 6, the NTT for the bit decompose of the first polynomial, at 602, begins by reading a polynomial associated with the first ciphertext $Ctxt_1$ from memory, such as at 604. The least significant bit of each integer in the polynomial is then output to the butterfly unit, at 606. Subsequent LSB outputs involve a shift in the values of the high and low shift registers. At 610, the NTT transform starts for the least significant bit, (after bypassing the addition logic of the butterfly, at 608), including multiplication by a constant operations and an output of the result, at 612.

With continued reference to FIG. 6, once the result of the first BTT bit decompose is output, at 612, the NTT decompose of the second polynomial step, at 614 begins. A polynomial associated with the second ciphertext $Ctxt_2$ may then be read from memory, such as at 616, and processed similarly to how the first ciphertext $Ctxt_1$ was processed.

Figure 7:
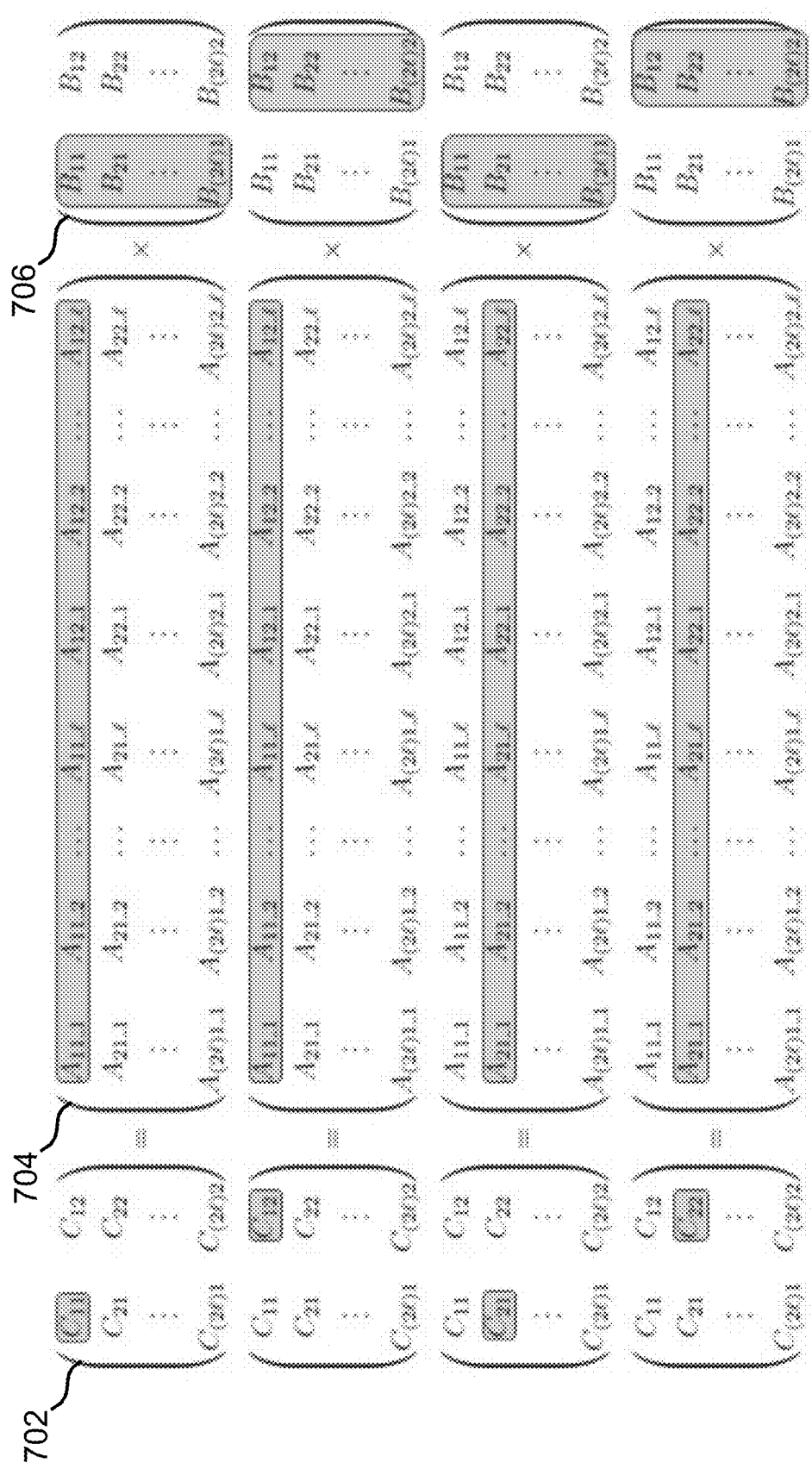
FIG. 7 illustrates a matrix row column multiply operation that corresponds to the timing diagram of FIG. 6.

In the third step, involving the multiply and accumulate operation, at 618, a transformed row of $Ctxt_1$ and a transformed column of $Ctxt_2$ are processed to compute an element in a resulting $Ctxt_3$. This is illustrated in FIG. 7 via a matrix multiplication table, where the upper leftmost matrix, at 702, represents $Ctxt_3$, while the middle matrix, at 704, represents $Ctxt_1$, and the rightmost matrix, at 706, represents $Ctxt_2$. The third step, multiply and accumulate, at 618 of FIG. 6, is repeated twice to compute a row in $Ctxt_3$ before repeating the same multiplication functions described above to transform another row in $Ctxt_1$ and compute the $Ctxt_3$ result.

For one embodiment, the memory contents are laid out, inside the memory, such that elements along the row of the Ctxt are read first before going to the next row. FIG. 7 shows that the elements of $Ctxt_1$, at 704, and $Ctxt_3$, at 702, are read in the normal order, along the row, whereas the elements of $Ctxt_2$, at 706, are read along the column. This either involves rearranging the elements in a different order, or employing a memory counter to account for this situation. One embodiment employs memory counters that count in even and odd steps. To read the first column in $Ctxt_2$, at 706, the even counter is first activated until all column elements are read, then the odd counter is activated to fetch the elements in the second column.

The operations described above, and shown in FIGS. 6 and 7, reflect that a certain row in $Ctxt_1$ is needed only two times to create the first row in $Ctxt_3$. This means that a full memory of a capacity capable of storing a bit-decomposed version of $Ctxt_1$ is unnecessary. Instead, a single row at a time may be transformed to compute the corresponding row in $Ctxt_3$. As a result, the amount of internal embedded memory may be minimized to greatly reduce the corresponding footprint of the integrated circuit chip.

Figure 8:
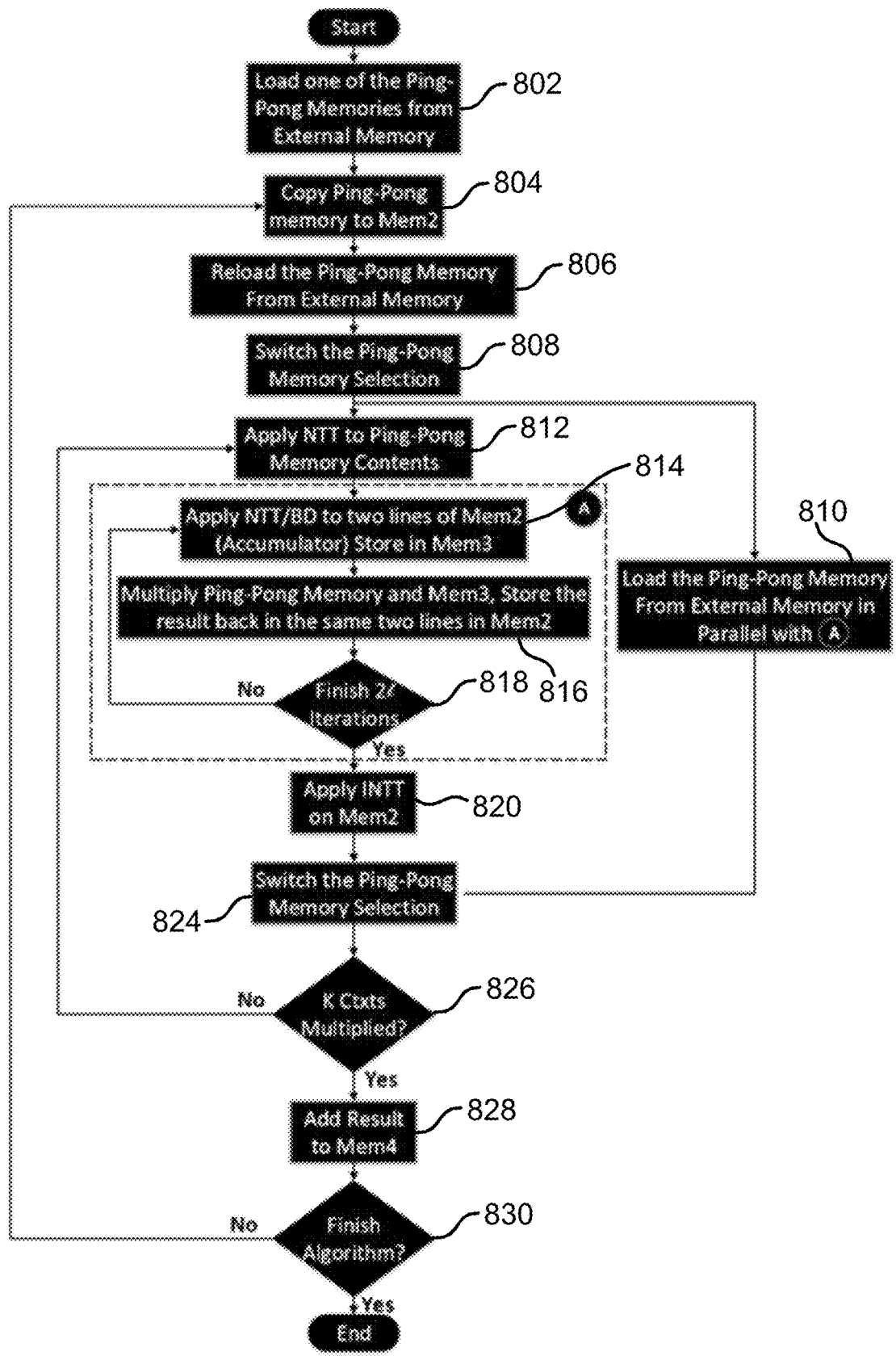
FIG. 8 illustrates one embodiment of a flow chart relating to flow control for the configurable NTT/INTT unit of FIG. 2.

FIG. 8 illustrates a flow chart of steps carried out by the specific memory architecture shown in FIG. 2 to accomplish various ciphertext and plaintext functions, consistent with the description above. Generally, the homomorphic encryption used by the system 200 allows for implementing the following general equation:

$$C_{res} = \sum_k \left( \prod_j \left( \sum_i \pm C_{ijk} (\text{or } P_{ijk}) \right) \right)$$

where $G_{ijk}$ represents the different ciphertexts, and $P_{ijk}$ represents the plaintexts. A portion of the internal memory of FIG. 2 is configured to store partial results associated with the equation above.

Further referring to FIG. 2 and FIG. 8, the flow control method employed by the system of FIG. 2 takes advantage of the ping-pong memories to process data in a sub-memory unit while loading the other sub-memory unit, similar to use of a dual buffer. This helps to efficiently satisfy the general equation above. The flow control method begins by loading one of the ping pong sub-memory units with data from the external memory 212 via the data path 214, at 802. The contents of the ping-pong memory are then copied to one of the other embedded memories, such as Mem2, at 804. After copying the contents, the ping-pong memory is reloaded with data from the external memory 212, at 806, and the ping-pong memory selection switched, at 808.

Further referring to FIG. 8, after switching the ping-pong memory selection, at 808, flow control continues along two concurrent paths. A first one of the paths involves loading one of the ping-pong memories from the external memory, at 810, then switching the memory selection, at 824.

With continued reference to FIG. 8, concurrent with the steps carried out by the first path above, the second path involves applying an NTT function to the contents of the other of the ping-pong memories, at 812. NTT bit decomposition operations are then applied to two lines of Mem2, and the results of an accumulation operation stored in Mem3, at 814. The ping-pong memory and Mem3 are then multiplied, with the result stored back to the same two lines in Mem2, at 816. A determination is then made, at 818, whether 21 iterations have been performed. If not, then the NTT bit decompose and multiplication steps are performed again. The sub-loop iterates until 21 iterations have been performed. Once the threshold is satisfied, then an inverse NTT operation is applied to the contents of Mem2, at 820.

Once the INTT operation is applied, at 820, the concurrent flow paths return to a single path where the ping-pong memory selection is again switched, at 824. A determination is then made as to whether "K" ciphertexts have been multiplied, at 826. If not, then an NTT operation is applied to the ping-pong memory, at 812, and steps 814-824 repeated. If "K" ciphertexts have been multiplied, then the result is added to Mem4, at 828. A determination is then made, at 830, as to whether the algorithm is finished. If additional processing is required, then steps 804-830 are repeated. Otherwise, the flow ends for the particular set of data.

FIGS. 9-12 illustrate how the multifunctional butterfly unit of FIG. 3 may be configured in various ways to enable the computational functions involving Ctxt addition, subtraction, multiplication and NTT/INTT transforms as described above.

Figure 9:
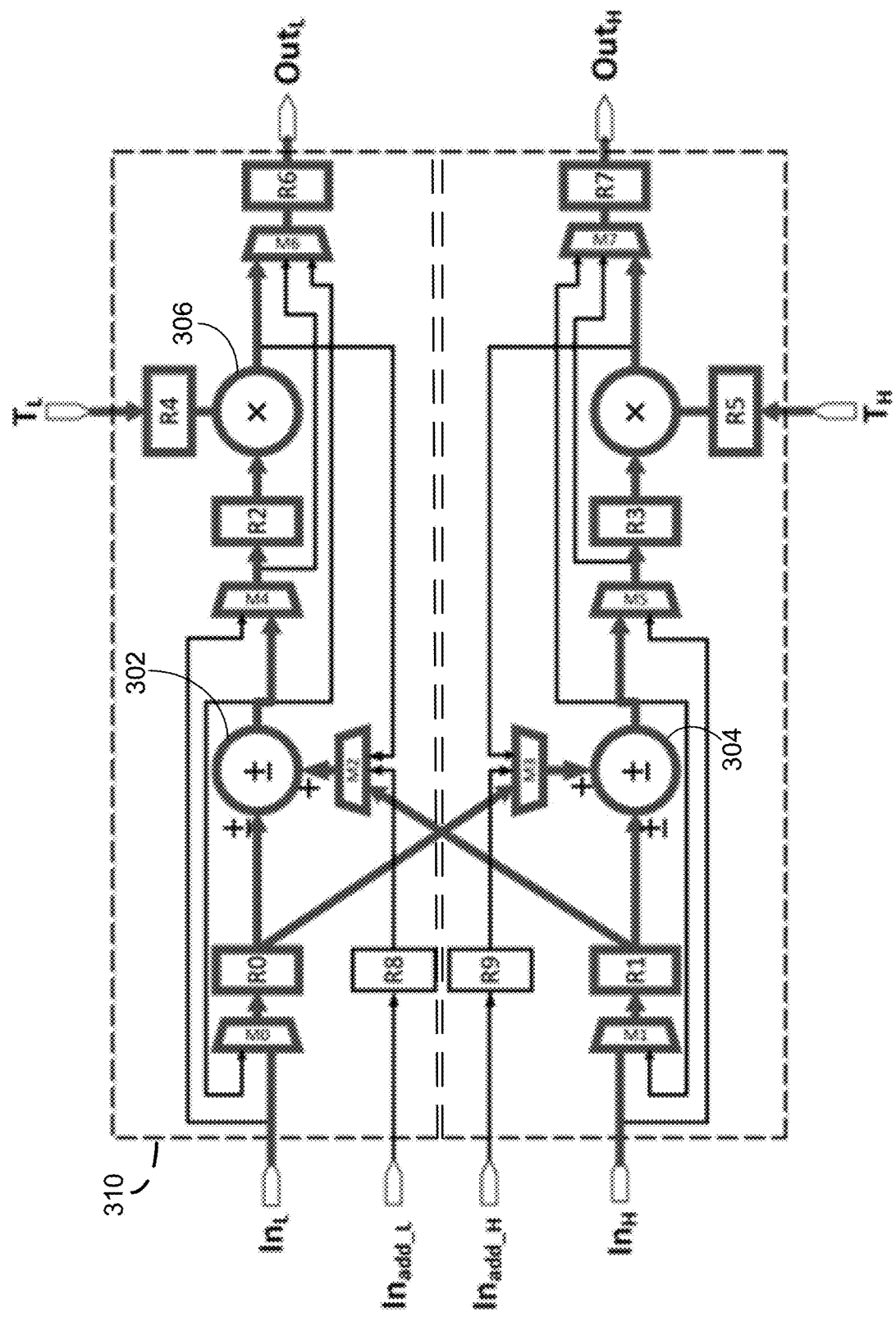
FIG. 9 illustrates a configuration of the NTT/INTT unit in a standard butterfly mode of operation.

FIG. 9 illustrates the multifunctional butterfly unit of FIG. 3 configured for a standard butterfly mode of operation (shown by the bold paths). The connections defining the configuration are responsive to control signals dispatched by the control logic, which implements the general formula:

$$\text{Out}_L = (T_L(\text{In}_L + \text{In}_H)) \bmod q \text{ and } \text{Out}_H = (T_H(\text{In}_L - \text{In}_H)) \bmod q.$$

This is accomplished through the generation and application of appropriate control signals to each of multiplexers M0-M7 to allow for selection of certain specified inputs to pass to the output of each multiplexer. As a result, for the low path 310, M0 will pass signal $\text{In}_L$ as an input to R0. The output of R0 will be fed through M3 as an input to the high path adder/subtractor 304, which is configured as a subtractor. The R0 output is also fed to an input to the low path adder/subtractor 302 which is configured as an adder. The output of the adder 302 is passed by M4 as an input to R2. The output of R2 is fed to low path multiplier 306. Twiddle factor $T_L$ is fed as an input to R4, while the output of R4 is fed as a second input to the multiplier 306. The output of the multiplier 306 is fed through M6 as the input to R6. The output of R6 becomes the resulting output $\text{Out}_L$ for the low path 310. The high path 312 is configured similarly, with a detailed description of each connection omitted for purposes of brevity.

Figure 10:
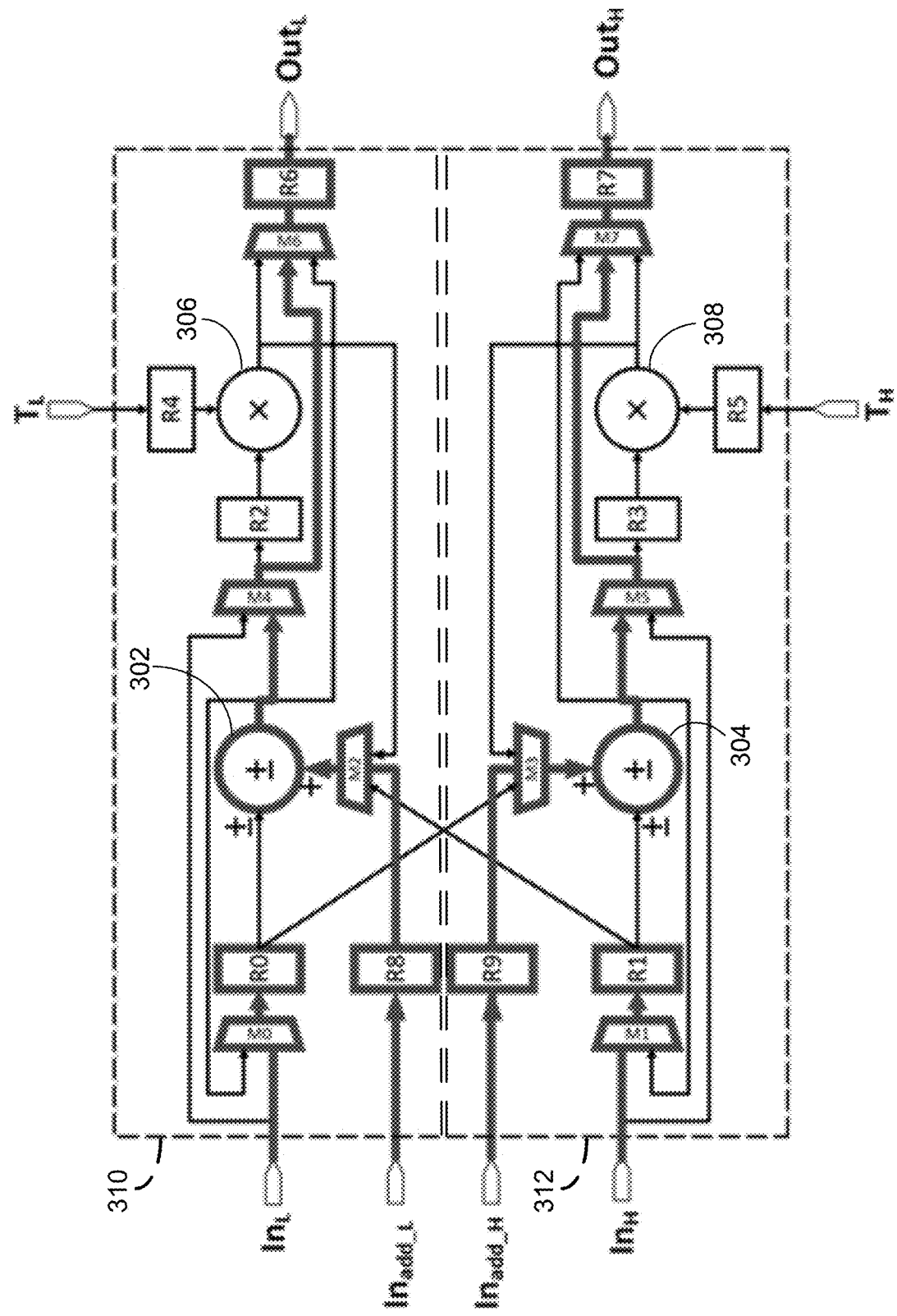
FIG. 10 illustrates a configuration of the NTT/INTT unit in an add/subtract mode of operation.

FIG. 10 illustrates the multifunctional butterfly unit 300 configured for an add/subtract mode of operation to implement the general formula:

$$\text{Out}_L = (\text{In}_L \pm \text{In}_{add\_L}) \bmod q \text{ and } \text{Out}_H = (\text{In}_H \pm \text{In}_{add\_H}) \bmod q.$$

Control signals issued by the control logic thus configure the multiplexers in the butterfly unit 300 similar to the standard butterfly mode, but such that the low and high paths 310 and 312 generally bypass the modular multipliers 306 and 308. The low and high paths 310 and 312 also do not implement cross-coupling. Moreover, for the add/subtract mode, additional inputs $\text{In}_{add\_L}$ and $\text{In}_{add\_H}$ are supplied to the respective modular adder/subtractor units 302 and 304 via registers R8 and R9.

Figure 11:
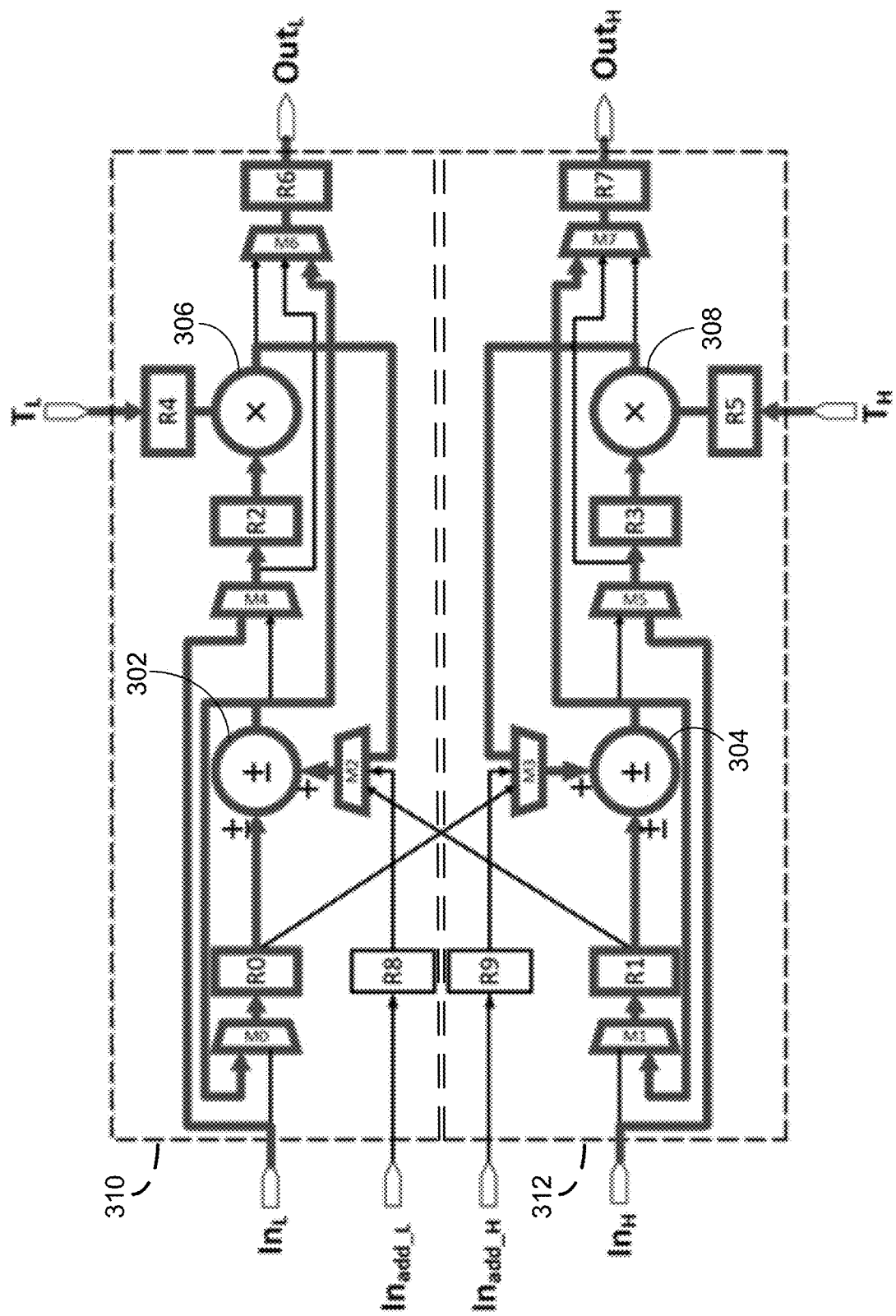
FIG. 11 illustrates a configuration of the NTT/INTT unit in a matrix multiply mode of operation.

FIG. 11 illustrates the multifunctional butterfly unit 300 configured for a matrix multiply mode of operation to implement the general formula:

$$Out_L=(Out_L+In_L\times T_L)\bmod q \text{ and } Out_H=(Out_H+In_H\times T_H)\bmod q.$$

This configuration realizes a multiply and accumulate function that employs the modular adder/subtractor units 302 and 304 as adders, and the multiplier units 306 and 308 of both low and high paths 310 and 312 without cross-coupling the paths. The low path 310 involves supplying input $In_L$ to register R2 via M4 for multiplication with twiddle factor input $T_L$, supplied via R4. The adder 302 receives the output of the multiplier 306 via M2, and also its own output fed back to R0 via M0. The adder output is fed through M6 to R6, where it is presented as the output $Out_L$. The high path 312 is configured similarly.

Figure 12:
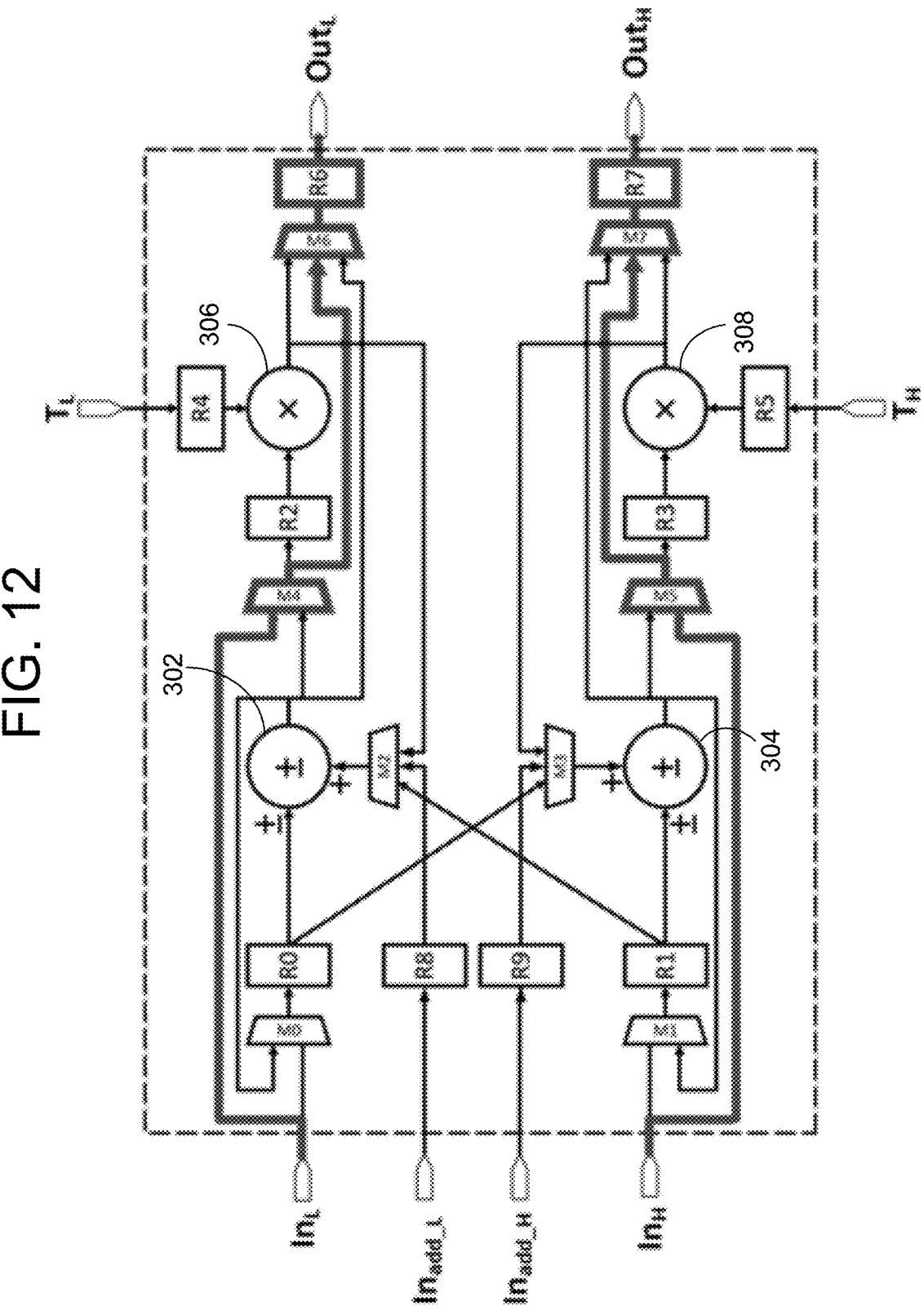
FIG. 12 illustrates a configuration of the NTT/INTT unit in a copy mode of operation.

FIG. 12 illustrates the multifunctional butterfly unit 300 configured for a copy mode of operation to implement the general formula:

$$Out_L=In_L \text{ and } Out_H=In_H$$

Essentially, the copy mode involves bypassing the modular adder/subtractors 302 and 304 and the modular multipliers in merely passing the inputs $In_L$ and $In_H$ directly to the outputs $Out_L$ and $Out_H$.

The FHE system described above lends itself well as an accompanying hardware resource to general computing and/or server platforms that may involve processing of third party data. In such an environment, one or more HPU integrated circuit chips may be installed in one or more server units as co-processors or hardware accelerators to carry out focused homomorphic processing tasks that may take place concurrent with server operations. With the HPU configured to handle such specific tasks, the server processing resources may be conserved and/or freed for server-specific tasks.

While the disclosure above discusses embodiments primarily in a fully homomorphic context, various concepts presented herein may be employed in partially homomorphic contexts as well. As an example, for high-throughput applications, it is possible to add additional reconfigurability to the presently proposed design in order to support partially homomorphic cryptosystems, like the Paillier Cryptosystem. These partially homomorphic encryption schemes, like the Paillier cryptosystem, generally involve large integer multipliers, which can be implemented, for example, using Schönhage-Strassen, Karatsuba, or Toom-Cook algorithms. Without loss of generality, as an example of instantiating these algorithms to the HPU hardware described above, the Schönhage-Strassen algorithm uses fast polynomial multiplication to perform fast integer multiplication. To perform large integer multiplication for two input numbers "a" and "b", we first compute the largest integer that can possibly result from our algorithm, we then pick an integer "w" which is larger than this largest possible result to avoid overflow. Afterwards, we split "a" and "b" into "m" groups of "w" bits as follows:

$$a = \sum_{i=0}^{m-1} a_i 2^{wi} \text{ and } b = \sum_{j=0}^{m-1} b_j 2^{wj}.$$

Let $x=2^w$, then the previous equation is equivalently, $$a = \sum_{i=0}^{m-1} a_i x^i \text{ and } b = \sum_{j=0}^{m-1} b_j x^j.$$

Then we can state that, $$ab = \sum_{i=0}^{m-1}\sum_{j=0}^{m-1} a_i b_j x^{(i+j)} = \sum_{k=0}^{2m-2} c_k x^k$$

Figure 13:
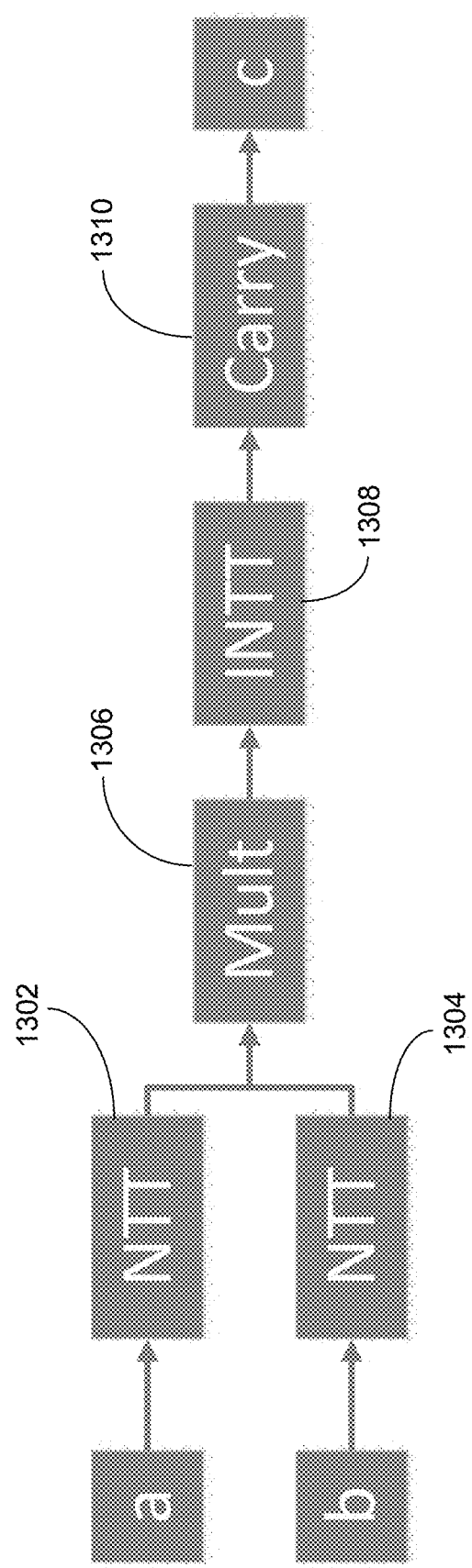
FIG. 13 illustrates use of an NTT butterfly unit in one embodiment of a partially homomorphic context.

The above equation can be computed efficiently using an NTT unit such as the Number Theoretic Transform (NTT) engine described herein, and shown in a partially homomorphic context in FIG. 13. Input numbers "a" and "b" are fed to respective NTT units 1302 and 1304. The numbers undergo a multiplication operation, at 1306, followed by an INTT operation, at 1308. A carry operation is then performed, at 1310, to achieve the result "c."

The Schönhage-Strassen algorithm described above can be efficiently implemented using the NTT engine described herein by partitioning the input integers into smaller parts where each part is stored in adjacent polynomial coefficients. Afterwards, the NTT transformation may be applied on both polynomials and coefficient-wise multiplication will be performed on the transformed polynomials. Finally, the result will be transformed back to the coefficient representation and a final carry propagation will be performed.

Such implementations would find utility in accelerating a wide range of important applications, for example, those found in particular secure voting systems, blockchains, secure contracts, certain multi-party computation (MPC) algorithms and cryptocurrencies.

Those skilled in the art will appreciate that the architecture described above significantly reduces the computational time to carry out homomorphic encryption processing functions on a single integrated circuit chip. Moreover, through efficient memory utilization, the size and power consumption of the chip is minimized.

When received within a computer system via one or more computer-readable media, such data and/or instruction-based expressions of the above described circuits may be processed by a processing identity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

According to an embodiment, the HPU chip may be mounted on a system in a form of a computer Card, a USB Stick, or any other form to be connected to a computer processor.

Various aspects and features of embodiments disclosed herein are set forth, for example and without limitation, in the following numbered clauses:

1. An integrated circuit (IC) homomorphic processor chip comprising:
    at least one processor slice, the slice including
        local control circuitry;
        a number theoretic transform (NTT) butterfly unit responsive to the local control circuitry to operate in multiple modes for performing operations on encrypted data using homomorphic encryption, each mode associated with a different configuration of the NTT butterfly unit; and
        on-chip memory coupled to the control circuitry and the NTT butterfly unit.
2. The IC homomorphic processor chip of clause 1, wherein the NTT butterfly unit is responsive to the local control circuitry to operate in multiple modes for operations involving fully homomorphic encryption.
3. The IC homomorphic processor chip of clause 1, wherein the NTT butterfly unit is responsive to the local control circuitry to operate in multiple modes for operations involving partially homomorphic encryption.
4. The IC homomorphic processor chip of clause 1, wherein:
    a first configuration for the NTT butterfly unit employs first circuitry to carry out a first ciphertext ($C_{txt}$) function; and
    a second configuration for the NTT butterfly unit reuses at least a portion of the first circuitry to carry out a second $C_{txt}$ function.
5. The IC homomorphic processor chip of clause 4, wherein:
    the first circuitry carries out a ciphertext ($C_{txt}$) addition function; and
    the second $C_{txt}$ function comprises a $C_{txt}$ multiplication function.
6. The IC homomorphic processor chip of clause 5, wherein:
    the first circuitry includes a modular adder.
7. The IC homomorphic processor chip of clause 6, wherein:
    the modular adder comprises a combinational modular adder.
8. The IC homomorphic processor chip of clause 6, wherein:
    the modular adder comprises a sequential modular adder.
9. The IC homomorphic processor chip of clause 5, wherein:
    the second configuration includes second circuitry comprising a modular multiplier.
10. The IC homomorphic processor chip of clause 9, wherein the modular multiplier comprises a parallel integer multiplier.
11. The IC homomorphic processor chip of clause 10, wherein the modular multiplier further comprises:
    a modular reduction unit.
12. The IC homomorphic processor chip of clause 1, wherein the IC homomorphic processor includes multiple processor slices, and wherein the IC homomorphic processor further comprises:
    master control circuitry to interface the multiple processor slices with external memory via an external processor interface.
13. The IC homomorphic processor chip of clause 12, wherein the local control circuitry receives instructions from the master control circuitry to:
    retrieve a set of $C_{txt}$ coefficient values from the memory;
    load the set of values into a processing pipeline;
    perform at least one Ctxt operation; and
    store the transformed values to a destination memory location.
14. The IC homomorphic processor chip of clause 13, wherein the instructions from the master control circuitry further comprises instructions to:
    perform NTT transformations on the loaded set of values to generate corresponding transformed values in the NTT domain.
15. The IC homomorphic processor chip of clause 14, wherein the instructions from the master control circuitry to perform at least one Ctxt operation comprises instructions to:
    perform at least one Ctxt operation from the group consisting of addition operation, subtraction operation, multiplication operation, XOR operation, XNOR operation, AND operation, equality operation, smaller than operation, larger than operation, identity operation, copy operation and negation operation.

16. The IC homomorphic processor chip of clause 1, wherein:
the NTT butterfly unit is realized as a single-stage unit.

17. A homomorphic encryption system, comprising:
an integrated circuit (IC) homomorphic processor chip;
main memory external to the IC homomorphic processor chip;
a data path for transferring data between the main memory and the IC homomorphic processor chip;
a control path to control the transfers between the main memory and the IC homomorphic processor chip; and
wherein the IC homomorphic processor chip comprises
master control circuitry to control the transfers of data between the main memory and the IC homomorphic processor chip via the control path; and
multiple processor slices corresponding to a pipeline depth, each of the multiple processor slices including local control circuitry;
a number theoretic transform (NTT) butterfly unit responsive to the local control circuitry to operate in multiple modes for performing operations on encrypted data using homomorphic encryption, each mode associated with a different configuration of the NTT butterfly unit; and
on-chip memory coupled to the local control circuitry and the NTT butterfly unit.

18. The homomorphic encryption system of clause 17, wherein the homomorphic encryption comprises fully homomorphic encryption.

19. The homomorphic encryption system of clause 17, wherein the homomorphic encryption comprises partially homomorphic encryption.

20. The homomorphic encryption system of clause 17, wherein the master control circuitry schedules operations for each of the multiple processor slices to:
retrieve a set of $C_{txt}$ coefficient values from the external memory;
load the set of values into a processing pipeline;
perform at least one Ctxt operation to generate transformed values; and
store the transformed values to a destination memory location.

21. The homomorphic encryption system of clause 20, wherein the scheduled operations from the master control circuitry further comprises scheduled operations for each of the multiple processor slices to:
perform NTT transformations on the loaded set of values to generate corresponding transformed values in the NTT domain.

22. The homomorphic encryption system of clause 21, wherein the scheduled operations from the master control circuitry further comprises scheduled operations for each of the multiple processor slices to:
perform at least one Ctxt operation from the group consisting of addition operation, subtraction operation, multiplication operation, XOR operation, XNOR operation, AND operation, equality operation, smaller than operation, larger than operation, identity operation, copy operation and negation operation.

23. The homomorphic encryption system of clause 20, wherein:
each of the NTT butterfly units comprises a single-stage butterfly; and
wherein a given NTT transformation operation involves log(n)–1 stages of evaluation by the NTT butterfly unit, where "n" represents a degree of a polynomial associated with the coefficient values.

24. A number theoretic transform (NTT) butterfly circuit comprising:
a high input word path including
a first adder/subtractor,
a first multiplier, and
first selection circuitry coupled to the first adder/subtractor and the first multiplier and including respective bypass paths to selectively bypass the first adder/subtractor and the first multiplier;
a low input word path including
a second adder/subtractor,
a second multiplier, and
second selection circuitry coupled to the second adder/subtractor and the second multiplier and including respective bypass paths to selectively bypass the second adder/subtractor and the second multiplier;
wherein the high and low input word paths are cross-coupled, and the first and second selection circuitry is responsive to different mode control signals to reconfigure the low and high input word paths into different logic processing units.

25. The NTT butterfly circuit of clause 24, wherein:
a first configuration for the NTT butterfly circuit employs first circuitry to carry out a ciphertext ($C_{txt}$) addition function; and
a second configuration for the NTT butterfly circuit reuses at least a portion of the first circuitry to carry out a $C_{txt}$ multiplication function.

26. The NTT butterfly circuit of clause 24, wherein:
each of the first and second adder/subtractors comprises a combinational modular adder.

27. The NTT butterfly circuit of clause 24, wherein:
each of the first and second multipliers comprises a parallel integer multiplier.

28. The NTT butterfly circuit of clause 24, wherein each of the first and second multipliers further comprises:
a modular reduction unit.

29. The NTT butterfly circuit of clause 24, wherein:
each of the first and second adder/subtractors and multipliers includes associated critical paths; and
wherein each of the associated critical paths is bounded by register circuitry.

30. The NTT butterfly circuit of clause 24, wherein:
the NTT butterfly circuit is realized as a single-stage butterfly; and
wherein a given NTT transformation operation involves log(n)–1 stages of evaluation by the NTT butterfly circuit, where "n" represents a degree of a polynomial associated with the coefficient values.

31. A method of operation in a homomorphic processor integrated circuit (IC) chip, the method comprising:
transforming ciphertext (Ctxt) symbols into a number theoretic transform (NTT) domain, the transforming including, for a given processor slice,
generating a mode control signal with local control circuitry, the mode control signal corresponding to one of multiple modes of operations involving homomorphic encryption; and
configuring NTT butterfly unit in response to the mode control signal.

32. The method of operation in a homomorphic processor IC chip according to clause 31, wherein the homomorphic encryption comprises fully homomorphic encryption.

33. The method of operation in a homomorphic processor IC chip according to clause 31, wherein the homomorphic encryption comprises partially homomorphic encryption.

34. The method according to clause 31, wherein the mode control signal comprises a first mode control signal corresponding to a first mode of operation, and wherein the NTT butterfly unit responds to the first mode control signal by:
   configuring the NTT butterfly unit to carry out a Ctxt addition function.
35. The method according to clause 34, wherein the mode control signal comprises a second mode control signal corresponding to a second mode of operation, and wherein the NTT butterfly unit responds to the second mode control signal by:
   configuring the NTT butterfly unit to carry out a Ctxt multiplication function; and
   reusing a portion of the NTT butterfly unit employed in the addition function to carry out the multiplication function.
36. The method according to clause 31, wherein the transforming comprises:
   operating multiple processor slices in parallel, each processor slice including a copy of the local control circuitry and a copy of the NTT butterfly unit.
37. The method according to clause 36, further comprising:
   pipelining multiple operations carried out by the multiple processor slices.
38. The method according to clause 37, further comprising:
   interfacing the multiple processor slices with external memory via an external processor interface, the interfacing controlled by master control circuitry.
39. The method according to clause 38, wherein the master control circuitry generates instructions for the local control circuitry of the multiple slices, the local control circuitry responsive to the instructions to carry out the steps including:
   retrieving a set of Ctxt coefficient values from the memory;
   loading the set of values into a processing pipeline;
   performing at least one Ctxt operation to generate transformed values; and
   storing the transformed values to a destination location in the external memory.
40. The method according to clause 39, further comprising the step of performing NTT transformations on the loaded set of values to generate corresponding transformed values in the NTT domain.
41. The method according to clause 40, wherein the at least one Ctxt operation is selected from the group consisting of addition operation, subtraction operation, multiplication operation, XOR operation, XNOR operation, AND operation, equality operation, smaller than operation, larger than operation, identity operation, copy operation and negation operation.
42. A method of operation in a homomorphic encryption system, the method comprising:
   providing a homomorphic processor integrated circuit (IC) chip including configurable number theoretic transform (NTT) butterfly logic;
   interfacing the homomorphic processor IC chip with external memory via a data path and a control path; and
   transforming ciphertext (Ctxt) symbols into an NTT domain, the transforming including, for a given processor slice,
      generating a mode control signal with local control circuitry, the mode control signal corresponding to one of multiple modes of operations involving homomorphic encryption, and
      configuring NTT butterfly unit in response to the mode control signal.
43. The method of operation in a homomorphic encryption system according to clause 42, wherein the homomorphic encryption comprises fully homomorphic encryption.
44. The method of operation in a homomorphic encryption system according to clause 42, wherein the homomorphic encryption comprises partially homomorphic encryption.
44. The method according to clause 42, wherein the mode control signal comprises a first mode control signal corresponding to a first mode of operation, and wherein the NTT butterfly unit responds to the first mode control signal by:
   configuring the NTT butterfly unit to carry out a Ctxt addition function.
45. The method according to clause 44, wherein the mode control signal comprises a second mode control signal corresponding to a second mode of operation, and wherein the NTT butterfly unit responds to the second mode control signal by:
   configuring the NTT butterfly unit to carry out a Ctxt multiplication function; and
   reusing a portion of the NTT butterfly unit employed in the addition function to carry out the multiplication function.
46. The method according to clause 42, wherein the transforming comprises:
   operating multiple processor slices in parallel, each processor slice including a copy of the local control circuitry and a copy of the NTT butterfly unit.
47. The method according to clause 46, further comprising:
   pipelining multiple operations carried out by the multiple processor slices.
48. The method according to clause 47, further comprising:
   interfacing the multiple processor slices with external memory via an external processor interface, the interfacing controlled by master control circuitry.
49. The method according to clause 48, wherein the master control circuitry generates instructions for the local control circuitry of the multiple slices, the local control circuitry responsive to the instructions to carry out the steps including:
   retrieving a set of Ctxt coefficient values from the memory;
   loading the set of values into a processing pipeline;
   performing at least one Ctxt operation to generate transformed values; and
   storing the transformed values to a destination location in the external memory.
50. The method according to clause 49 further comprising the step of performing NTT transformations on the loaded set of values to generate corresponding transformed values in the NTT domain.
51. The method according to clause 50 wherein the at least one Ctxt operation is selected from the group consisting of addition operation, subtraction operation, multiplication operation, XOR operation, XNOR operation, AND operation, equality operation, smaller than operation, larger than operation, identity operation, copy operation and negation operation.
52. A method of operation in a number theoretic transform (NTT) butterfly circuit, the circuit including a high input word path and a low input word path, the high input word path including a first adder/subtractor, and a first multiplier, the low input word path including a second adder/subtractor, and a second multiplier, wherein the method comprises:
   selectively bypassing the second adder/subtractor and the second multiplier; and reconfiguring the low and high input word paths into different logic processing units in response to different mode control signals.

53. The method according to clause 52, wherein the reconfiguring comprises:
in response to receiving a first mode control signal, configuring the NTT butterfly circuit to carry out a ciphertext ($C_{txt}$) addition function; and
in response to receiving a second mode control signal, configuring the NTT butterfly circuit to carry out a $C_{txt}$ multiplication function.

54. The method according to clause 52, further comprising:
employing a combinational modular adder for each of the first and second adder/subtractors.

55. The method according to clause 52, further comprising:
employing a parallel integer multiplier for each of the first and second multipliers.

56. The method according to clause 52, wherein each of the first and second multipliers includes a reduction unit, and wherein the method further comprises:
operating each reduction unit.

57. The NTT butterfly circuit of clause 52, wherein the NTT butterfly circuit is realized as a single-stage butterfly, and wherein the transforming comprises:
operating the NTT butterfly circuit through log(n)–1 stages of evaluation, where "n" represents a degree of a polynomial associated with coefficient values.

58. A homomorphic processor integrated circuit (IC) chip for transforming ciphertext ($C_{txt}$) symbols into a number theoretic transform (NTT) domain, the IC homomorphic processor chip comprising:
at least one processor slice, the slice including
local control circuitry;
an NTT butterfly unit; and
on-chip memory coupled to the control circuitry and the NTT butterfly unit, the on-chip memory partitioned into separately accessible storage units for homomorphic processing functions, the on-chip memory including
multiple input/output (I/O) storage units,
a bit decomposed polynomial storage unit, and
a twiddle factor memory unit.

59. The homomorphic processor IC chip according to clause 58, wherein:
a first one of the I/O storage units stores ciphertexts (Ctxts) in a row-by-row format; and
a second one of the I/O storage units stores Ctxts in a column-by-column format.

60. The homomorphic processor IC chip according to clause 59, wherein:
a third one of the I/O storage units stores output Ctxts resulting from a multiplication operation involving a first Ctxt from the first storage unit multiplied with a second Ctxt from the second storage unit.

61. The homomorphic processor IC chip according to clause 60, further comprising:
a memory counter coupled to the second memory unit.

62. The homomorphic processor IC chip according to clause 60, wherein:
a single row transformation of a Ctxt in a given row of the first one of the I/O storage units results in a corresponding resulting row in the third one of the I/O storage units.

63. The homomorphic processor IC chip according to clause 58, wherein:
one of the multiple I/O storage units is configured as a ping-pong memory coupled to an external memory.

64. The homomorphic processor IC chip according to clause 63, wherein the ping-pong memory includes:
a first sub-array to carry out a first memory operation; and
a second sub-array to carry out a second operation concurrent with the first memory operation.

65. The homomorphic processor IC chip according to clause 63, wherein the on-chip memory comprises DRAM.

66. A method of operation in a homomorphic processor integrated circuit (IC) chip, the method comprising:
partitioning on-chip memory into separately accessible storage units for homomorphic processing functions, the on-chip memory including multiple input/output (I/O) storage units, a bit decomposed polynomial storage unit, and a twiddle factor memory unit; and
performing at least one ciphertext (Ctxt) operation on a loaded set of values with a configurable number theoretic transform (NTT) butterfly unit coupled to the partitioned on-chip memory.

67. The method according to clause 66, further comprising:
transforming the loaded set of values to generate corresponding transformed values in the NTT domain.

68. The method according to clause 67 wherein the at least one Ctxt operation is selected from the group consisting of addition operation, subtraction operation, multiplication operation, XOR operation, XNOR operation, AND operation, equality operation, smaller than operation, larger than operation, identity operation, copy operation and negation operation.

69. The method according to clause 67, wherein the transforming further comprises:
reading a first ciphertext (Ctxt) from a first one of the I/O storage units in a row-by-row format; and
reading a second Ctxt from a second one of the I/O storage units in a column-by-column format.

70. The method according to clause 69, wherein the transforming further comprises:
multiplying the first Ctxt with the second Ctxt to generate a resulting Ctxt; and
writing the resulting Ctxt into a third one of the I/O storage units.

71. The method according to clause 66, wherein one of the multiple I/O storage units includes respective first and second sub-arrays configured as a ping-pong memory unit, wherein the method further comprises:
operating the first sub-array to carry out a first operation; and
operating the second sub-array to carry out a second operation concurrent with the first operation.

72. A method of operation in a homomorphic processor integrated circuit (IC) chip, the method comprising:
retrieving a first ciphertext (Ctxt) from a first on-chip memory unit, the first Ctxt retrieved via a row format read operation;
transforming the first Ctxt into a number theoretic transform (NTT) domain;
retrieving a second ciphertext (Ctxt) from a second on-chip memory unit, the second Ctxt retrieved via a column format read operation;
transforming the second Ctxt into the NTT domain;
multiplying the transformed first Ctxt with the transformed second Ctxt to generate a resulting Ctxt; and
storing the resulting Ctxt in a third memory unit.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A circuit, comprising:
number theoretic transform (NTT) circuitry including selection circuitry to configure the NTT circuitry into one of a first mode of operation or a second mode of operation;
wherein for the first mode of operation,
the selection circuitry is responsive to a first control signal to configure the NTT circuitry into a first logic processing unit; and
wherein for the second mode of operation,
the selection circuitry is responsive to a second control signal to configure the NTT circuitry into a second logic processing unit that is different than the first logic processing unit.

2. The circuit of claim 1, wherein:
for the first mode of operation, the first logic processing unit carries out a ciphertext ($C_{txt}$) addition function; and
for the second mode of operation, the second processing unit carries out a $C_{txt}$ multiplication function.

3. The circuit of claim 1, wherein the NTT circuitry further includes a high input word path and a low input word path, wherein:
the high input word path includes
a first adder/subtractor,
a first multiplier, and
wherein the selection circuitry is coupled to the first adder/subtractor and the first multiplier and including respective first bypass paths to selectively bypass the first adder/subtractor and the first multiplier; and
the low input word path includes
a second adder/subtractor,
a second multiplier, and
wherein the selection circuitry is coupled to the second adder/subtractor and the second multiplier and including respective second bypass paths to selectively bypass the second adder/subtractor and the second multiplier.

4. The circuit of claim 3, wherein:
the high and low input word paths are selectively cross-coupled.

5. The circuit of claim 3, wherein the first adder/subtractor and the second adder/subtractor each comprises:
a regular add/subtract unit having an output fed to a modular reduction unit.

6. The circuit of claim 5, wherein the regular add/subtract unit comprises a parallel adder.

7. The circuit of claim 5, wherein the modular reduction unit comprises one from the group including:
a Barrett modular reduction unit, a special prime modular reduction unit, and a Montgomery modular multiplication unit.

8. The circuit of claim 3, wherein the first multiplier and the second multiplier each comprise:
a modular adder.

9. The circuit of claim 3, wherein the first multiplier and the second multiplier each comprise:
an integer multiplier having an output fed to a modular reduction unit.

10. The circuit of claim 9, wherein the integer multiplier comprises:
a parallel integer multiplier.

11. A circuit, comprising:
number theoretic transform (NTT) circuitry including
selection circuitry responsive to a first control signal value to configure the NTT circuitry into a first mode of operation; and
wherein the selection circuitry is responsive to a second control signal value that is different than the first control signal value to configure the NTT circuitry into a second mode of operation that is different than the first mode of operation.

12. The circuit of claim 11, wherein:
for the first mode of operation, the NTT circuitry is configured into a first logic processing unit; and
for the second mode of operation, the NTT circuitry is configured into a second logic processing unit that is different from the first logic processing unit.

13. The circuit of claim 12, wherein:
for the first mode of operation, the first logic processing unit carries out a ciphertext ($C_{txt}$) addition function; and
for the second mode of operation, the second processing unit carries out a $C_{txt}$ multiplication function.

14. The circuit of claim 11, wherein the NTT circuitry includes:
a high input word path;
a low input word path; and
wherein the selection circuitry includes bypass circuitry to bypass portions of the high input word path or the low input word path based on receipt of the first control signal value or the second control signal value.

15. The circuit of claim 14, wherein:
the high and low input word paths are selectively cross-coupled.

16. The circuit of claim 14, wherein:
the high input word path includes
a first adder/subtractor,
a first multiplier, and
wherein the selection circuitry is coupled to the first adder/subtractor and the first multiplier and wherein the bypass circuitry is to selectively bypass the first adder/subtractor and the first multiplier; and
the low input word path includes
a second adder/subtractor,
a second multiplier, and
wherein the selection circuitry is coupled to the second adder/subtractor and the second multiplier and wherein the bypass circuitry is to selectively bypass the second adder/subtractor and the second multiplier.

17. A method of operation in a homomorphic processor integrated circuit (IC) chip, the method comprising:
configuring, with a selection circuit responsive to a first control signal value, a Number Theoretic Transform (NTT) circuit for a first mode of operation; and
configuring, with the selection circuit responsive to a second control signal value that is different than the first control signal value, the NTT circuit for a second mode of operation that is different than the first mode of operation.

18. The method according to claim 17, wherein:
for the first mode of operation, the configuring configures the NTT circuitry into a first logic processing unit; and
for the second mode of operation, the configuring configures the NTT circuitry into a second logic processing unit that is different from the first logic processing unit.

19. The method of claim 18, wherein:
performing, in the first mode of operation, a ciphertext ($C_{txt}$) addition function with the first logic processing unit; and performing, in the second mode of operation, a $C_{txt}$ multiplication function with the second processing unit.

\* \* \* \* \*